(12) United States Patent
Masuda et al.

(10) Patent No.: US 11,659,309 B2
(45) Date of Patent: May 23, 2023

(54) DISPLAY APPARATUS

(71) Applicant: Sony Group Corporation, Tokyo (JP)

(72) Inventors: Toshihiko Masuda, Tokyo (JP);
Hiroshi Yoshioka, Kanagawa (JP);
Hideyuki Taguchi, Tokyo (JP); Hiroki Matsuoka, Saitama (JP); Shinpei Kondo, Kanagawa (JP)

(73) Assignee: Sony Group Corporation

( * ) Notice: Subject to any disclaimer, the term of this patent is extended or adjusted under 35 U.S.C. 154(b) by 0 days.

(21) Appl. No.: 16/343,467

(22) PCT Filed: Nov. 10, 2017

(86) PCT No.: PCT/JP2017/040558
§ 371 (c)(1),
(2) Date: Apr. 19, 2019

(87) PCT Pub. No.: WO2018/123292
PCT Pub. Date: Jul. 5, 2018

(65) Prior Publication Data
US 2019/0268681 A1    Aug. 29, 2019

(30) Foreign Application Priority Data

Feb. 27, 2016  (JP) .............. JP2016-253664
May 19, 2017   (JP) .............. JP2017-099629

(51) Int. Cl.
*H04R 1/02*   (2006.01)
*H04M 1/03*   (2006.01)
(Continued)

(52) U.S. Cl.
CPC ............ *H04R 1/028* (2013.01); *G09F 9/00* (2013.01); *H04M 1/035* (2013.01); *H04R 7/04* (2013.01);
(Continued)

(58) Field of Classification Search
None
See application file for complete search history.

(56) References Cited

U.S. PATENT DOCUMENTS

| 5,537,482 A | 7/1996 | Janning |
| 2002/0018578 A1 | 2/2002 | Burton |

(Continued)

FOREIGN PATENT DOCUMENTS

| CN | 1243652 A | 2/2000 |
| CN | 1328762 A | 12/2001 |

(Continued)

OTHER PUBLICATIONS

International Search Report corresponding to PCT/JP2017/040558, dated Feb. 6, 2018 (3 pgs.).
(Continued)

*Primary Examiner* — Nicholas J Lee
(74) *Attorney, Agent, or Firm* — Lerner David LLP

(57) ABSTRACT

A display apparatus according to an embodiment of the present disclosure includes a thin plate-shaped display cell that displays image and a plurality of exciters disposed on a back surface of the display cell and causing the display cell to vibrate. The plurality of exciters is such configured that the plurality of exciters is regarded as one exciter when the plurality of exciters generates vibration in the display cell.

7 Claims, 25 Drawing Sheets

(51) Int. Cl.
  *H04R 7/04* (2006.01)
  *H04R 9/02* (2006.01)
  *H04R 9/06* (2006.01)
  *G09F 9/00* (2006.01)

(52) U.S. Cl.
  CPC ............ *H04R 7/045* (2013.01); *H04R 9/022* (2013.01); *H04R 9/025* (2013.01); *H04R 9/066* (2013.01); *H04R 2201/003* (2013.01); *H04R 2499/15* (2013.01)

(56) References Cited

U.S. PATENT DOCUMENTS

| | | | |
|---|---|---|---|
| 2004/0086144 A1 | 5/2004 | Kallen | |
| 2008/0292128 A1* | 11/2008 | Ishii | H05K 7/20009 381/388 |
| 2010/0103778 A1* | 4/2010 | Kang | H04R 1/24 367/189 |
| 2015/0341714 A1 | 11/2015 | Ahn et al. | |
| 2016/0073195 A1* | 3/2016 | Adamson | H04R 3/14 381/338 |
| 2017/0353801 A1* | 12/2017 | Li | H04R 9/022 |

FOREIGN PATENT DOCUMENTS

| | | |
|---|---|---|
| CN | 101253804 A | 8/2008 |
| CN | 101321410 A | 12/2008 |
| EP | 1947901 A1 | 7/2008 |
| JP | 2002510182 A | 4/2002 |
| JP | 2004072226 A | 3/2004 |
| JP | 2005130397 A | 5/2005 |
| JP | 2007143010 A | 6/2007 |
| JP | 2009159104 A | 7/2009 |
| JP | 2015219528 A | 12/2015 |
| KR | 20150133918 A | 12/2015 |
| WO | 9831188 A1 | 7/1998 |
| WO | 0033612 A2 | 6/2000 |
| WO | 2008029083 A1 | 3/2008 |

OTHER PUBLICATIONS

Supplementary European Search Report with Written Opinion for Application No. 17885758.7 dated Dec. 5, 2019, 8 pages.

* cited by examiner

[ FIG. 1 ]
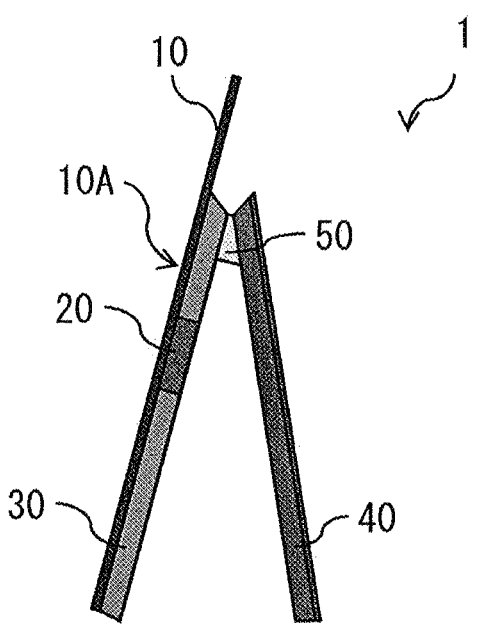
[ FIG. 2 ]
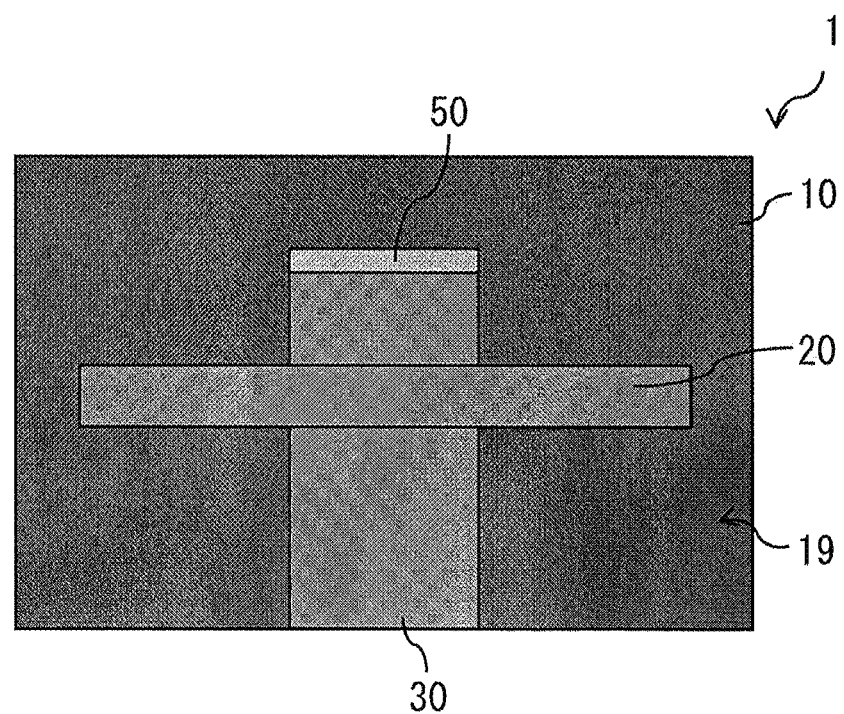

[ FIG. 3 ]
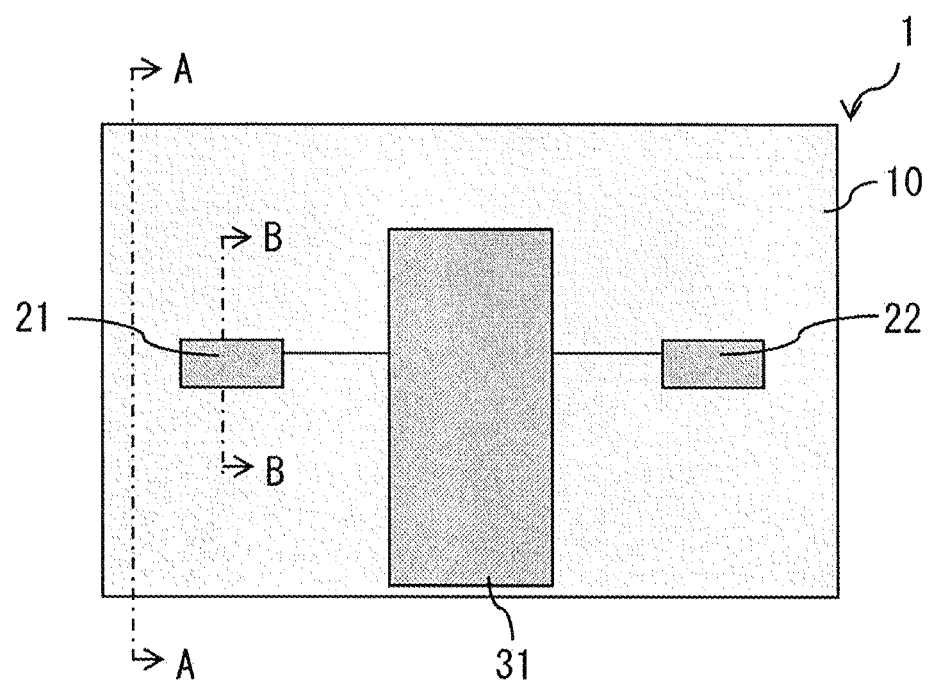

[ FIG. 4 ]
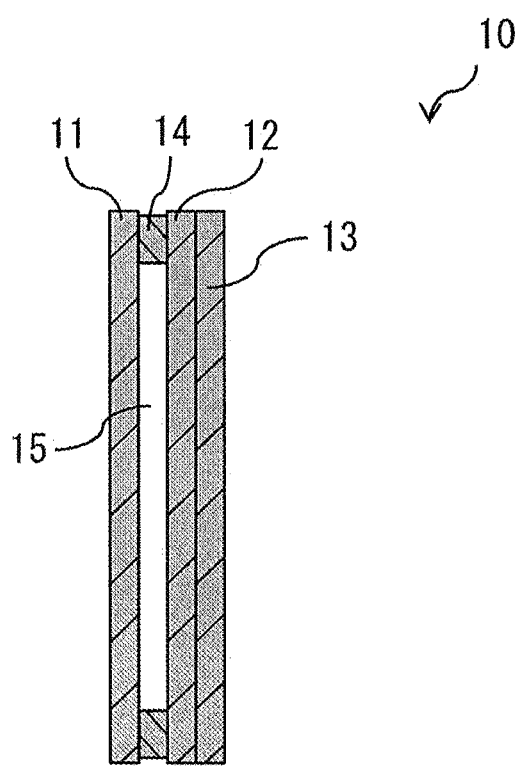

[ FIG. 5 ]
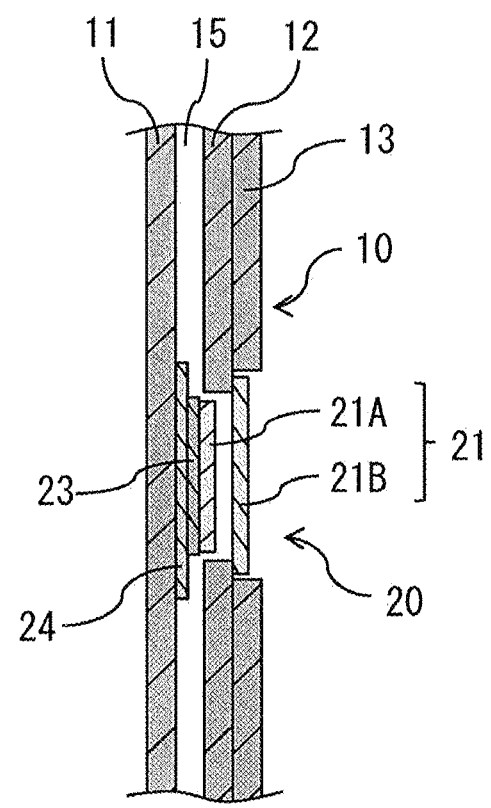

[ FIG. 6 ]
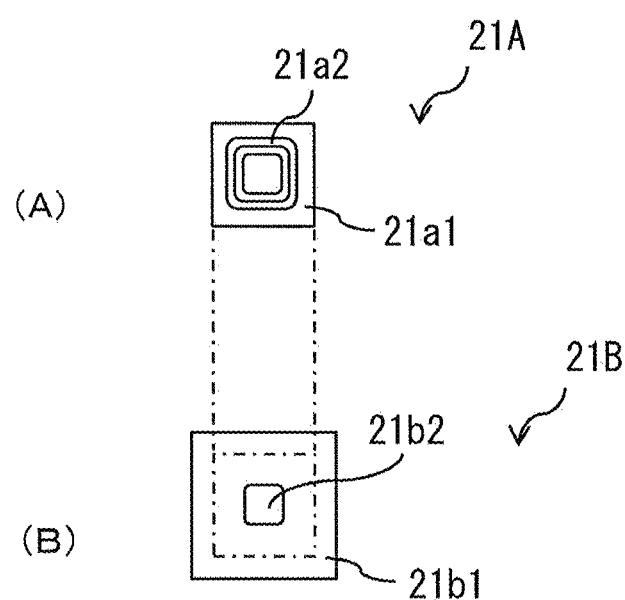

[ FIG. 7 ]
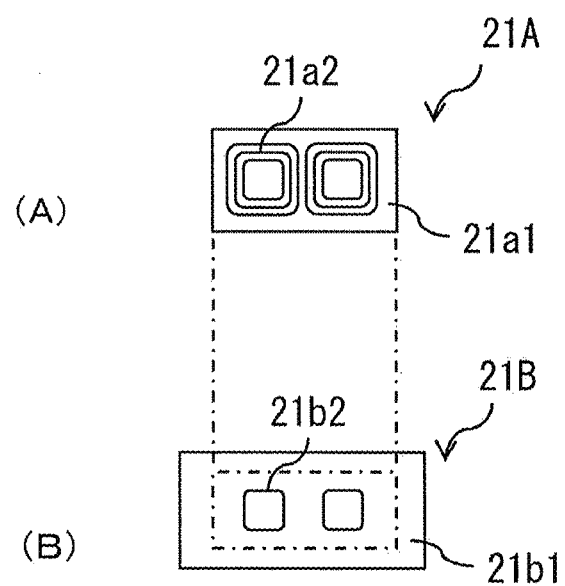
[ FIG. 8 ]
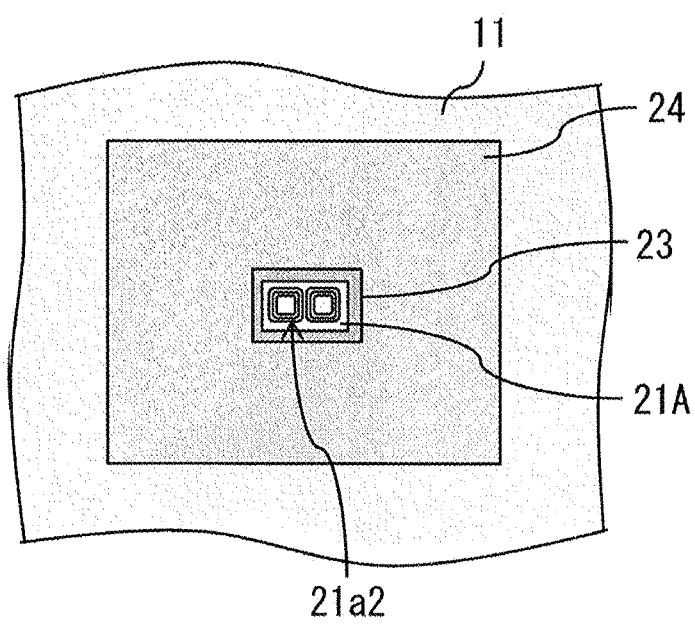

[ FIG. 9 ]
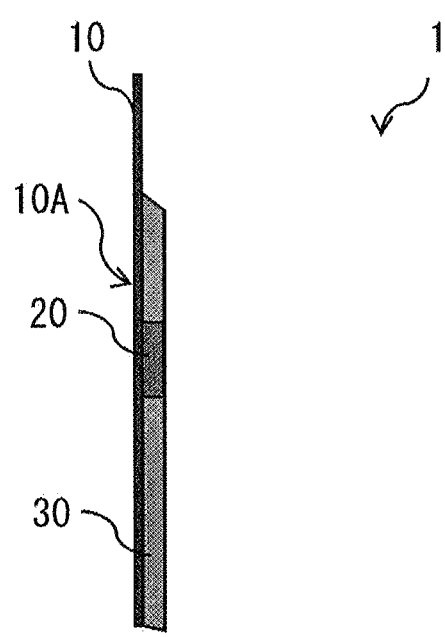

[ FIG. 10 ]
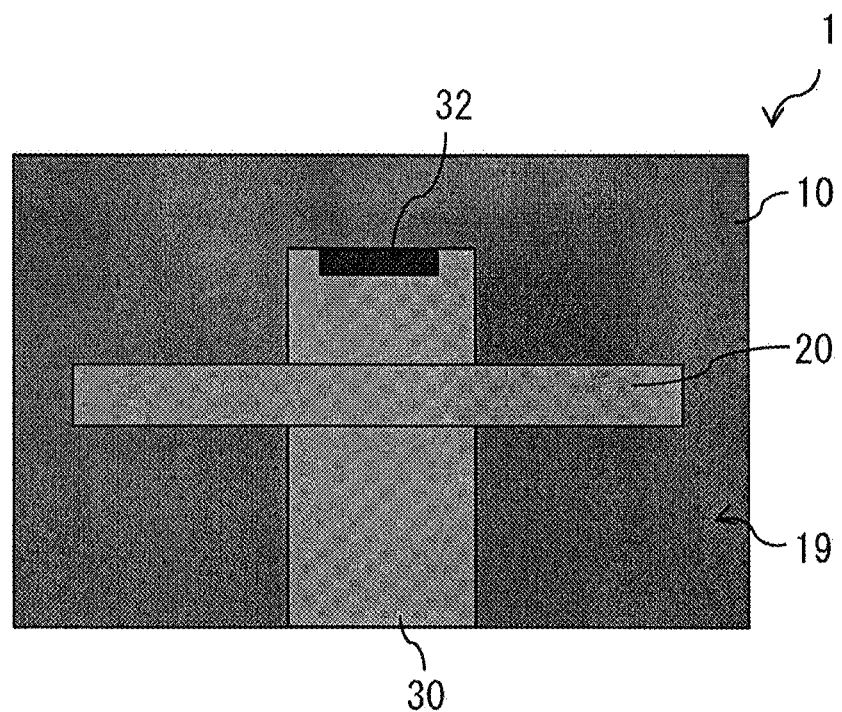
[ FIG. 11 ]
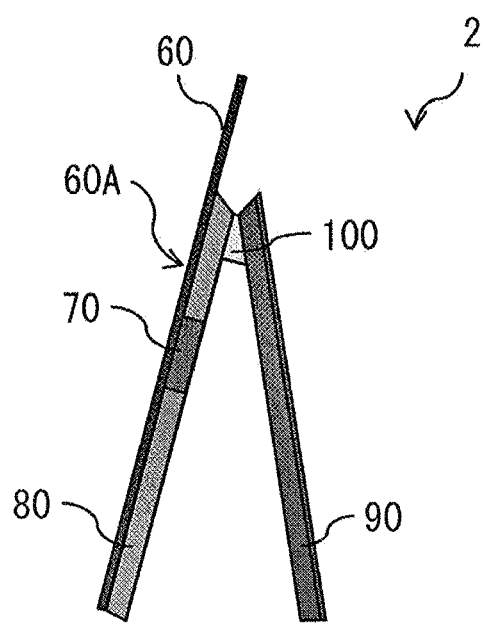

[ FIG. 12 ]
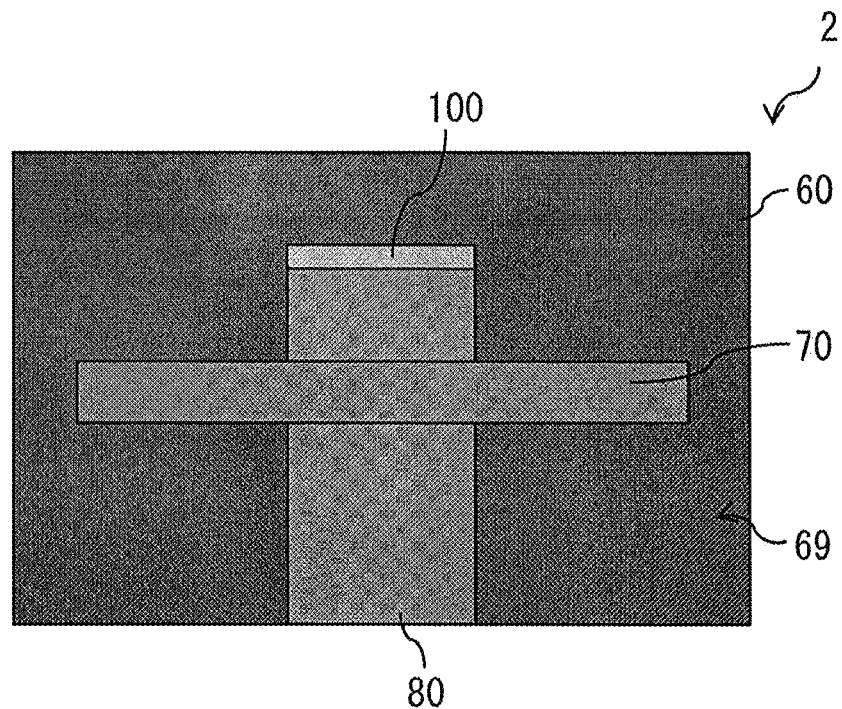
[ FIG. 13 ]
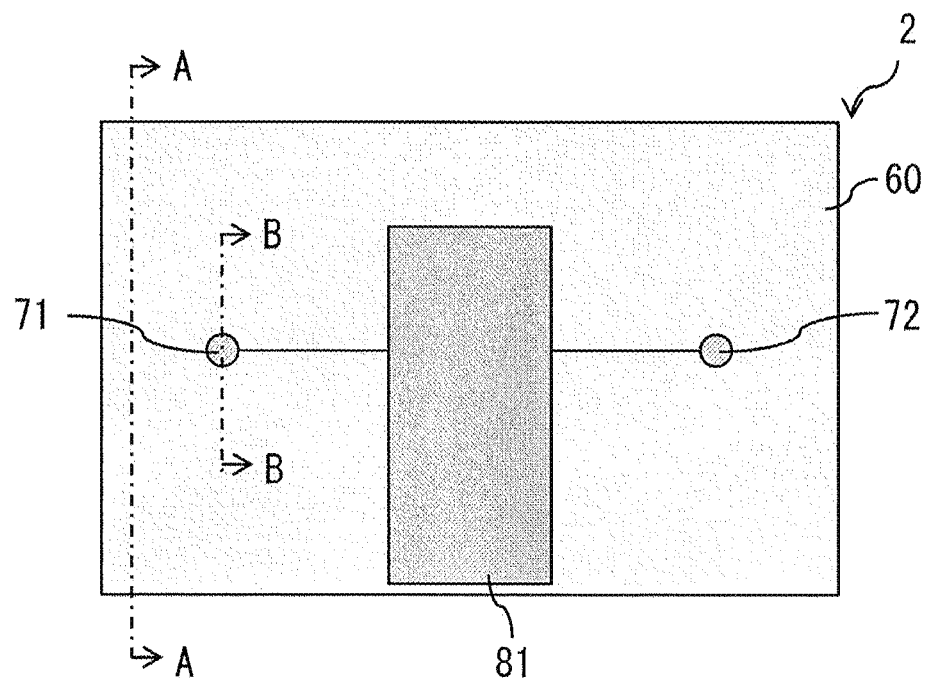

[ FIG. 14 ]
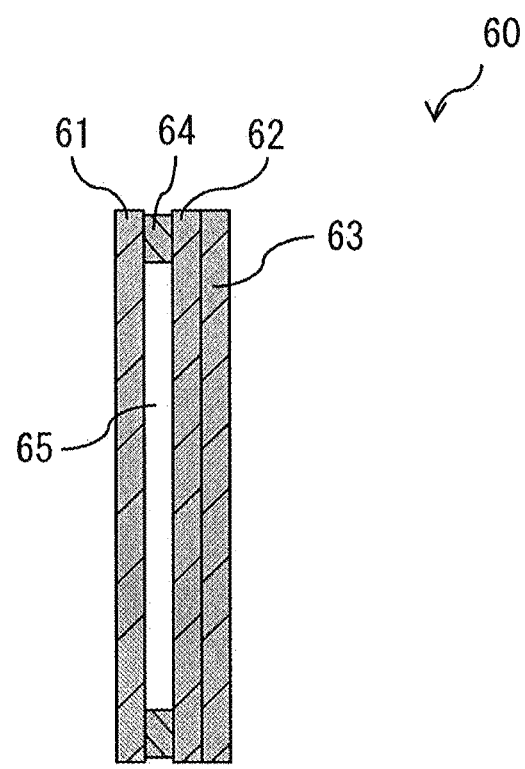

[ FIG. 15 ]
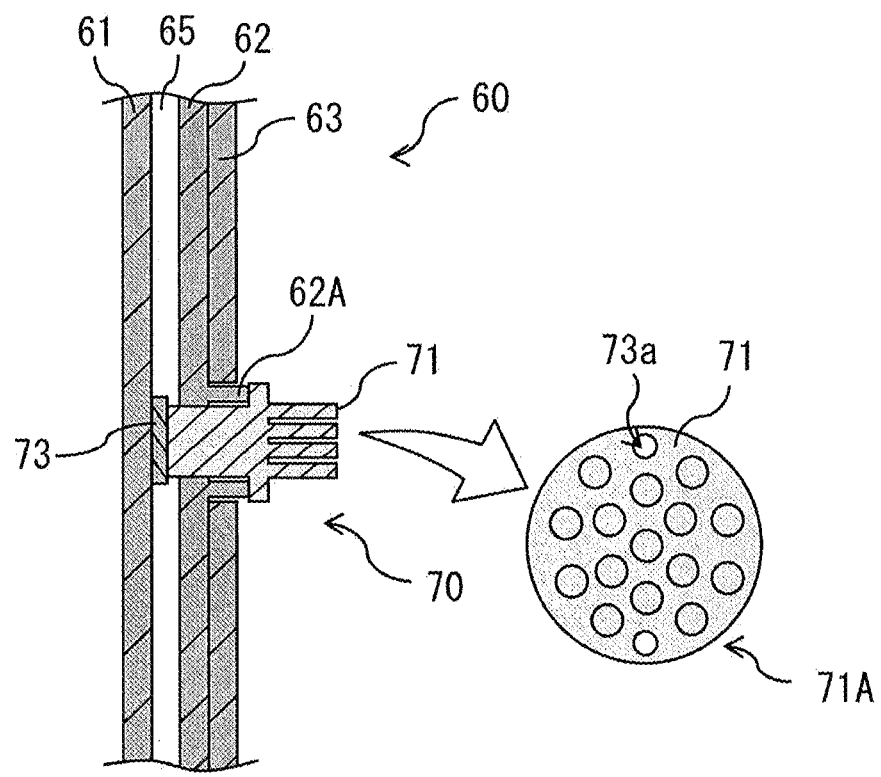

[ FIG. 16 ]
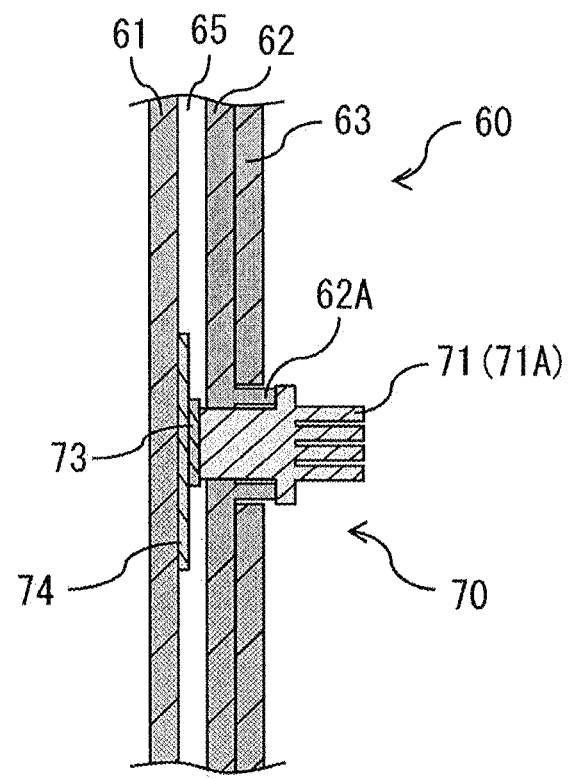
[ FIG. 17 ]
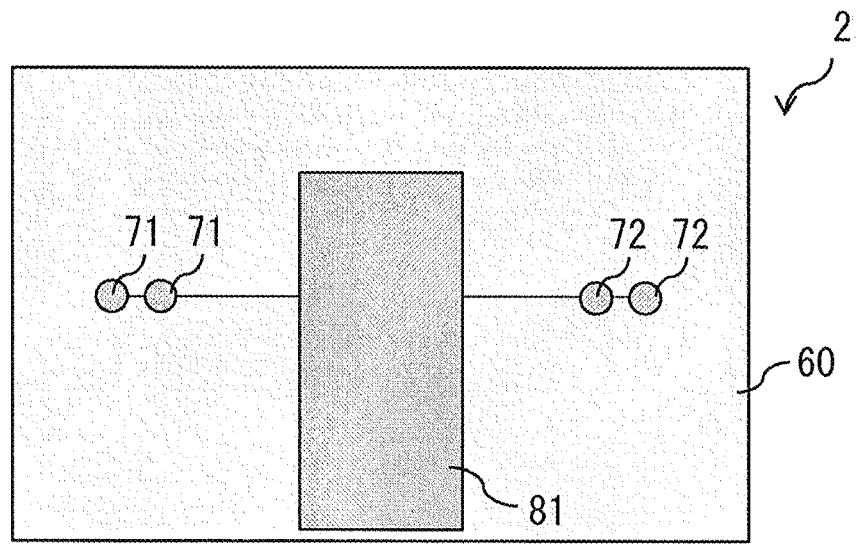

[ FIG. 18 ]
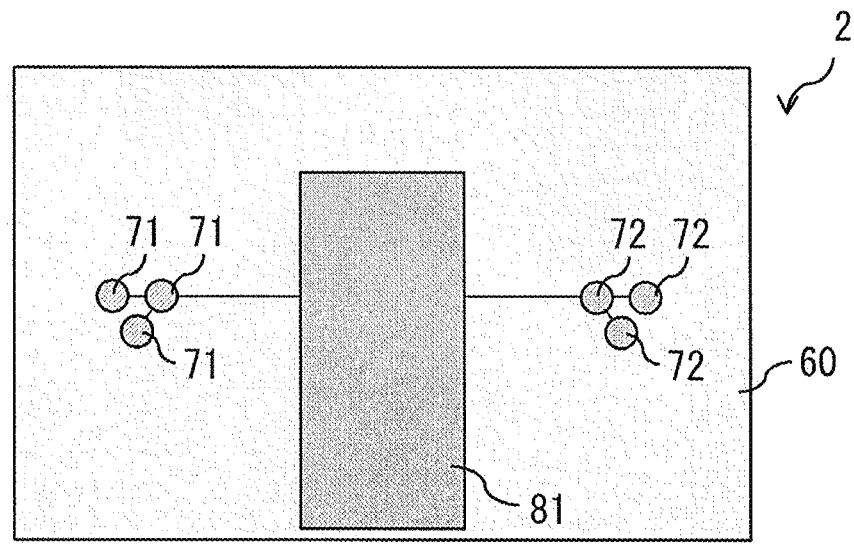
[ FIG. 19 ]
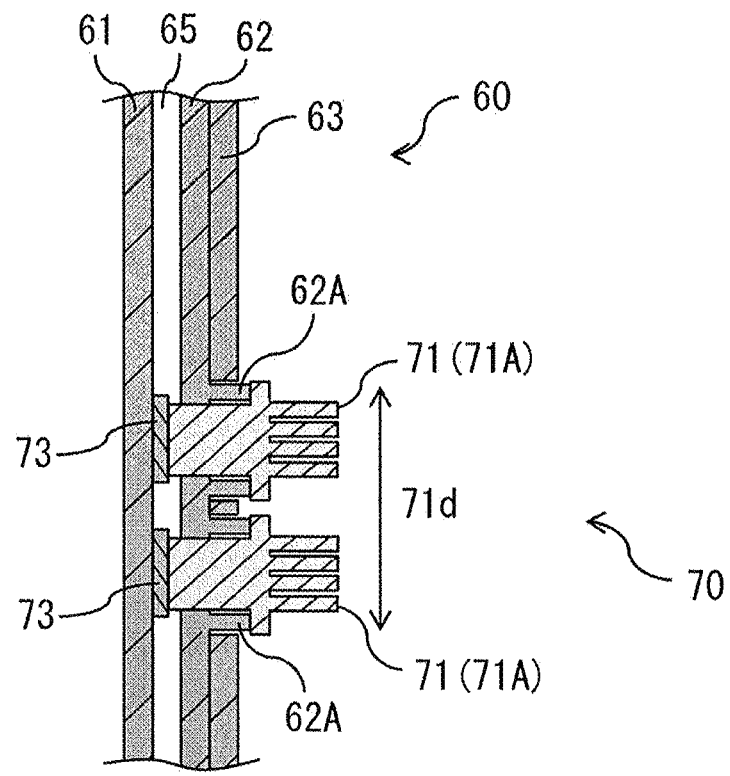

[ FIG. 20 ]
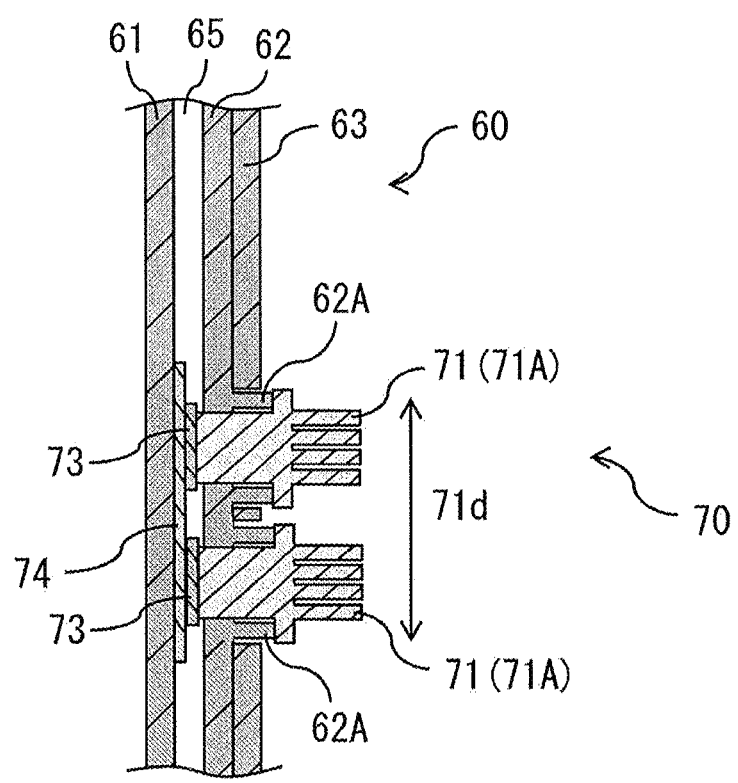

[ FIG. 21 ]
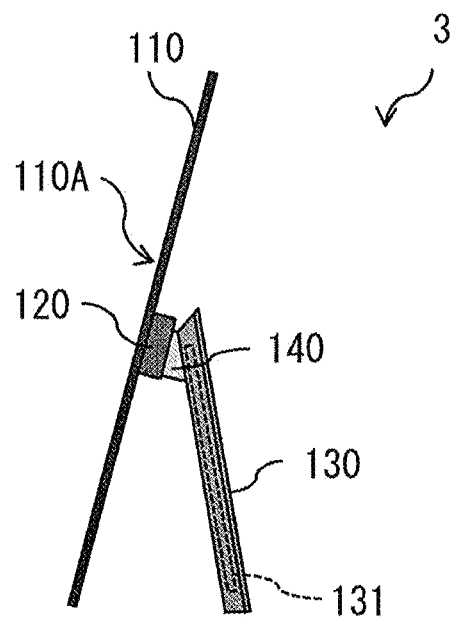
[ FIG. 22 ]
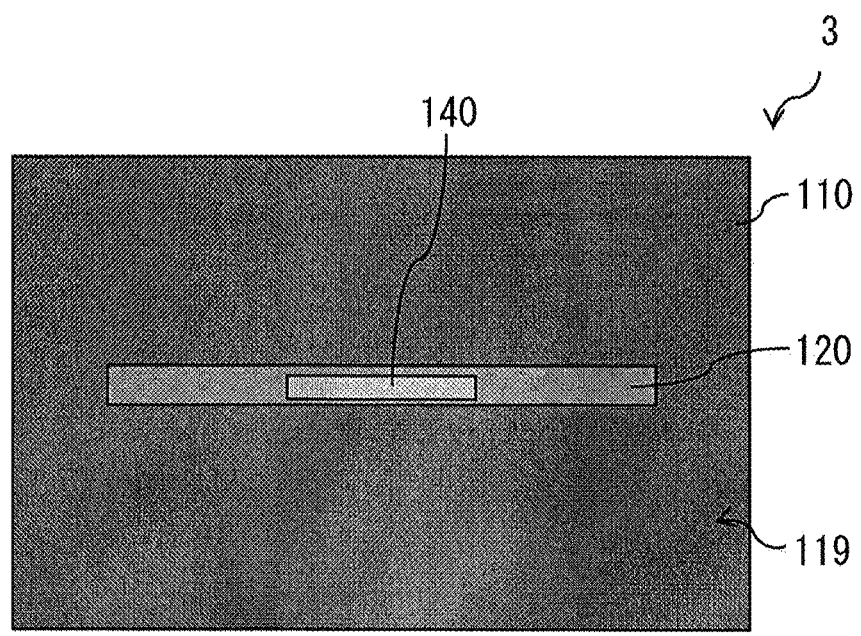

[ FIG. 23 ]
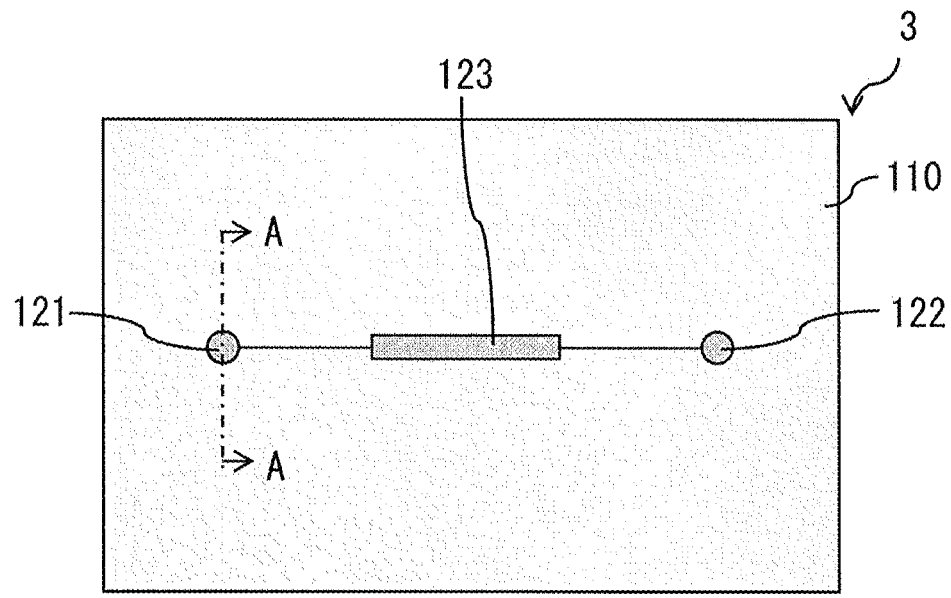
[ FIG. 24 ]
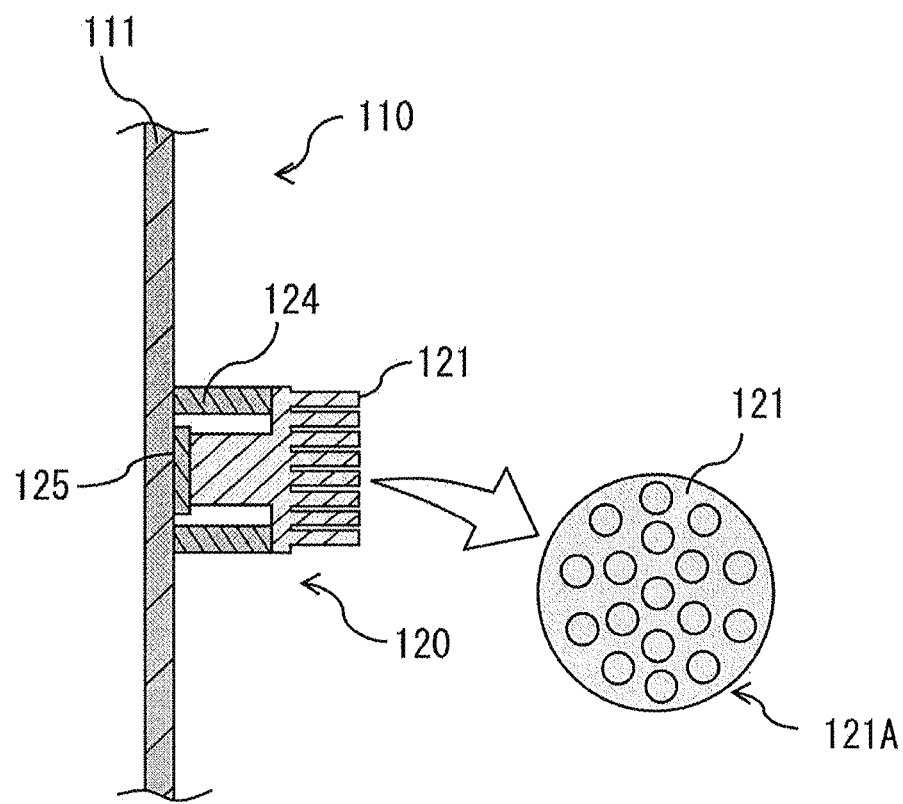

[FIG. 25]
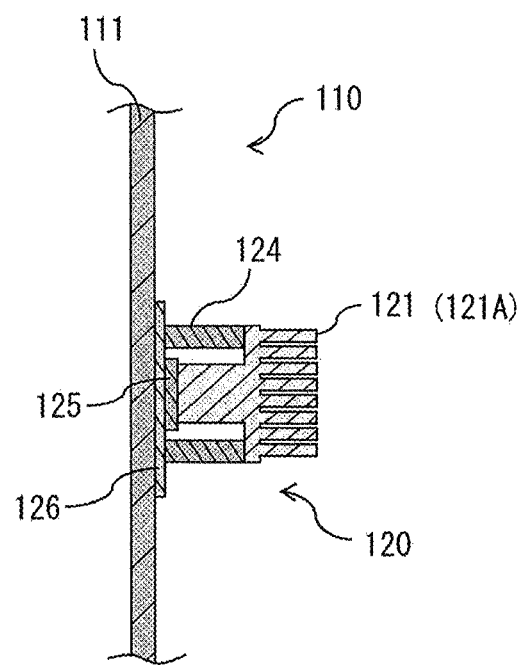

[ FIG. 26 ]
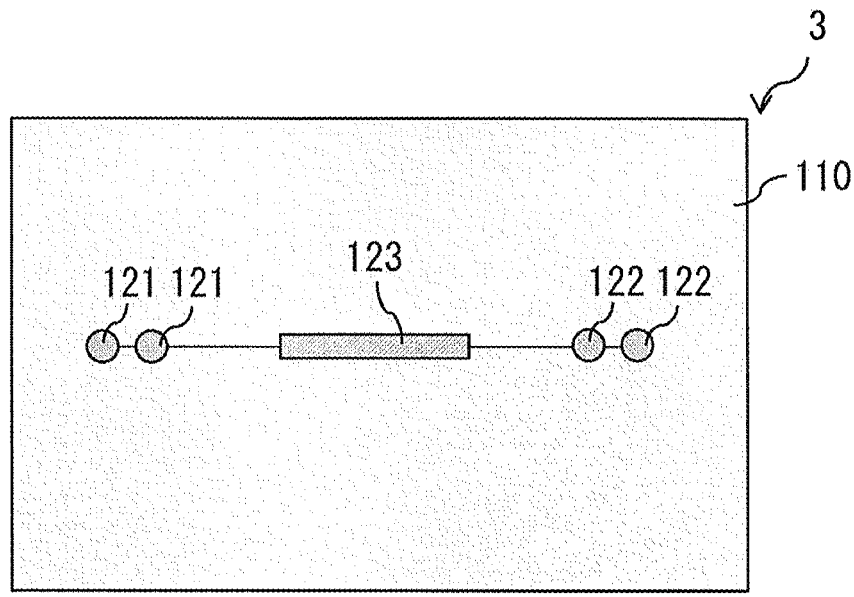
[ FIG. 27 ]
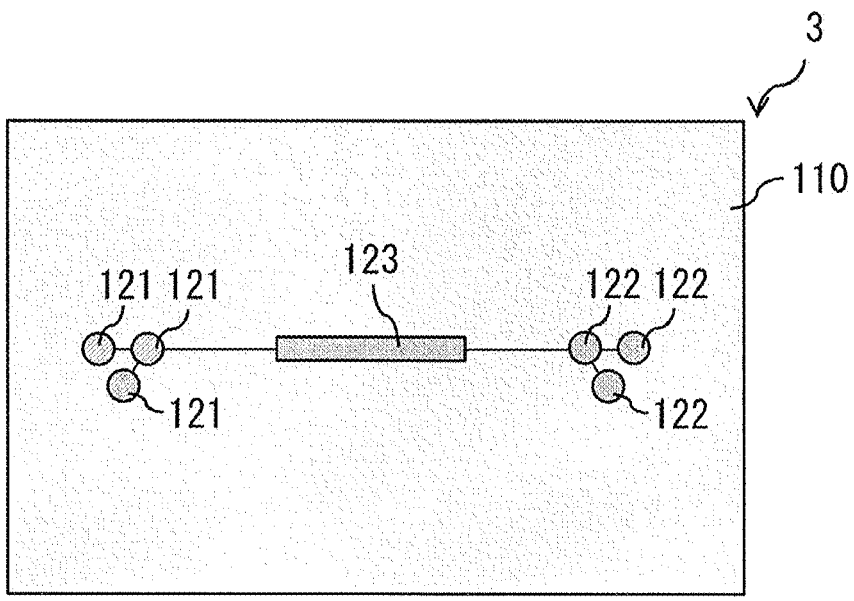

[ FIG. 28 ]
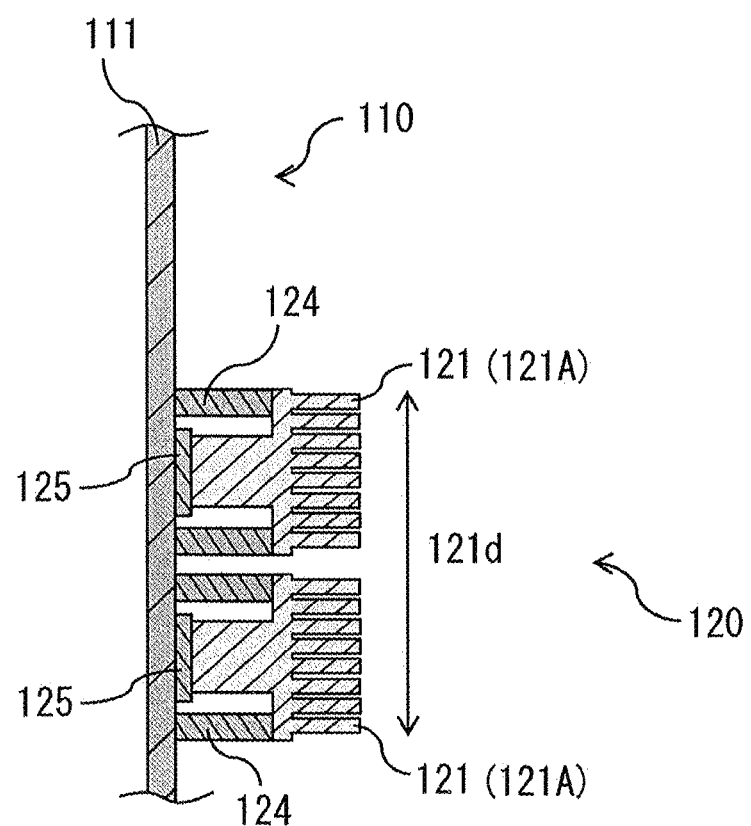

[ FIG. 29 ]
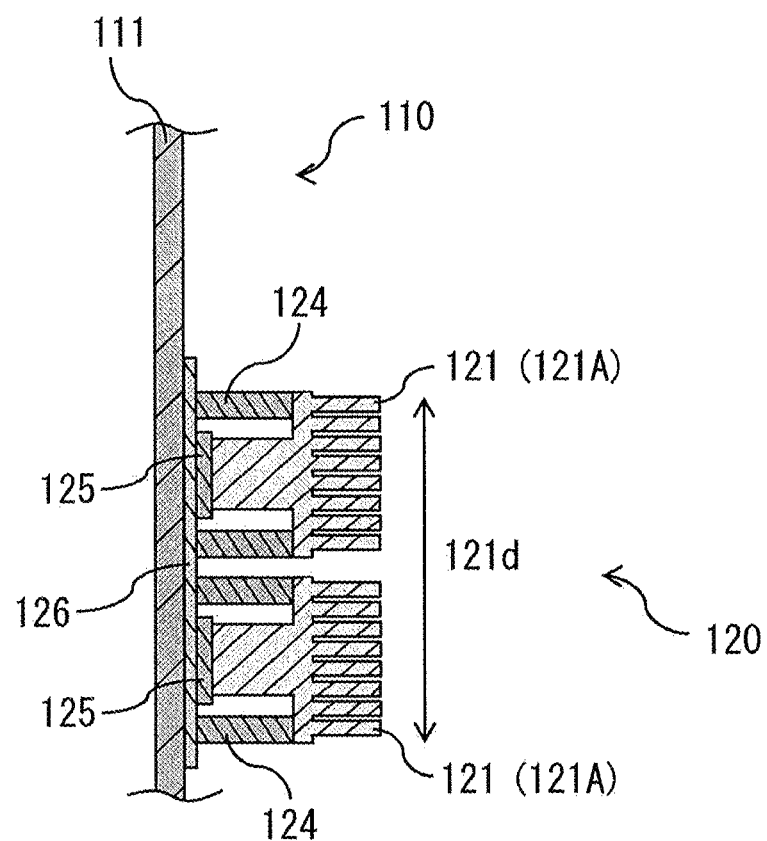

[ FIG. 30 ]
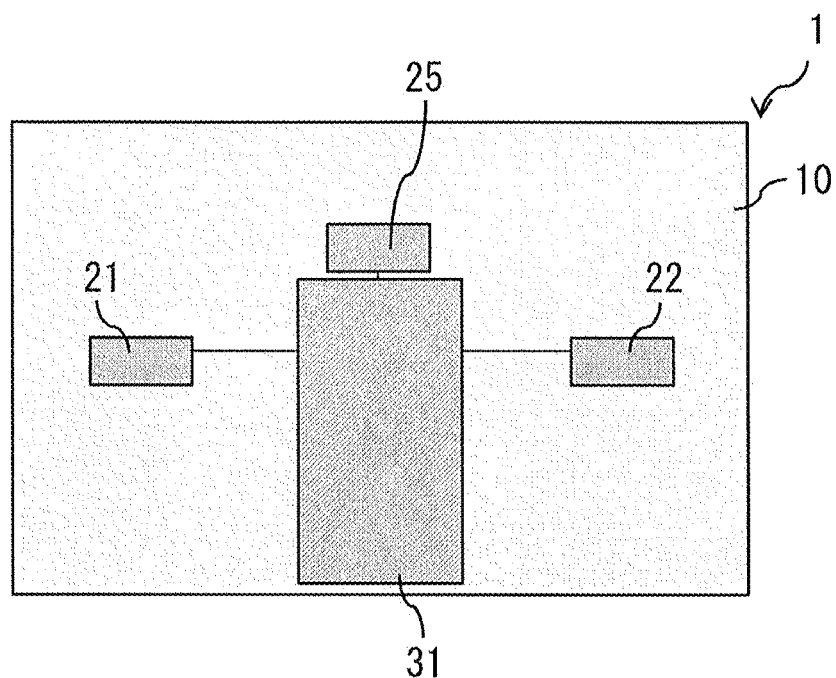
[ FIG. 31 ]
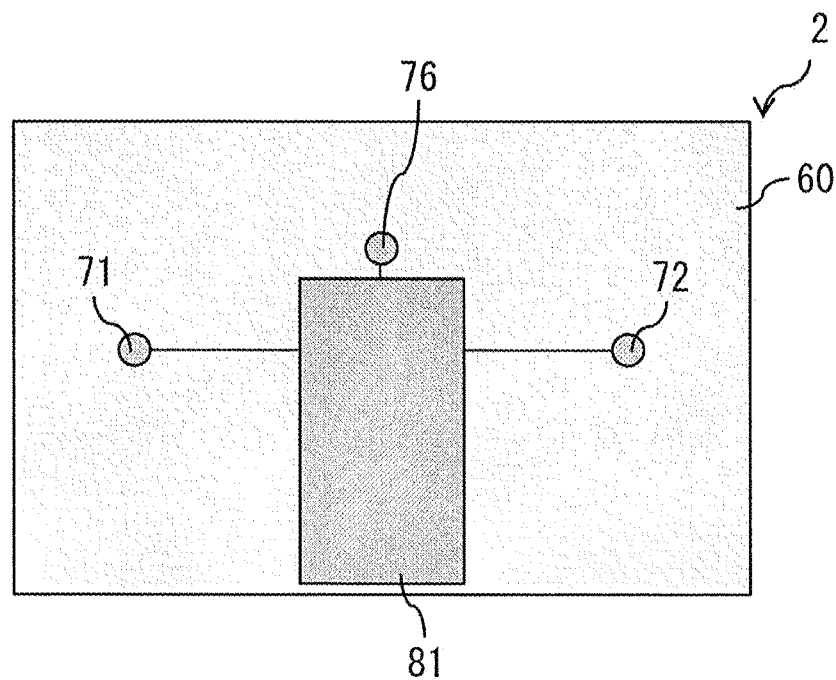

[ FIG. 32 ]
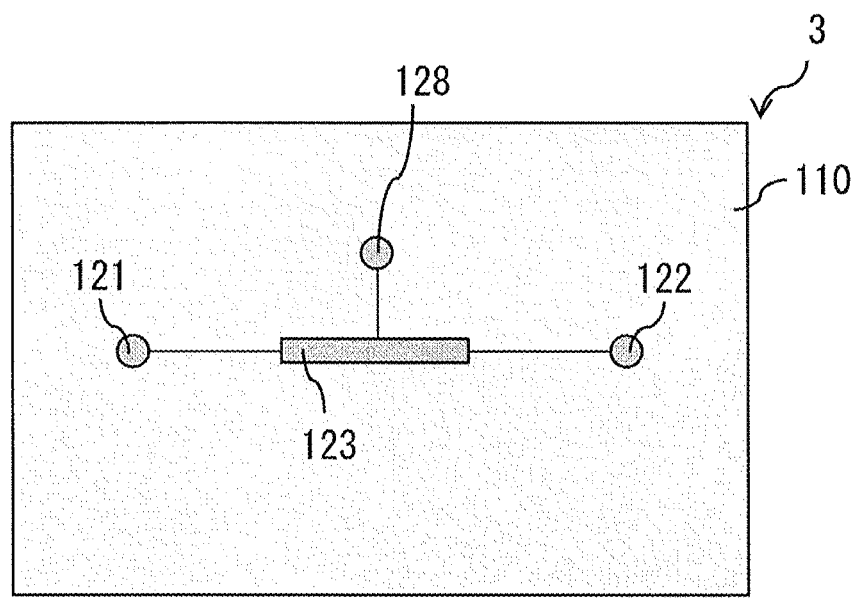
[ FIG. 33 ]
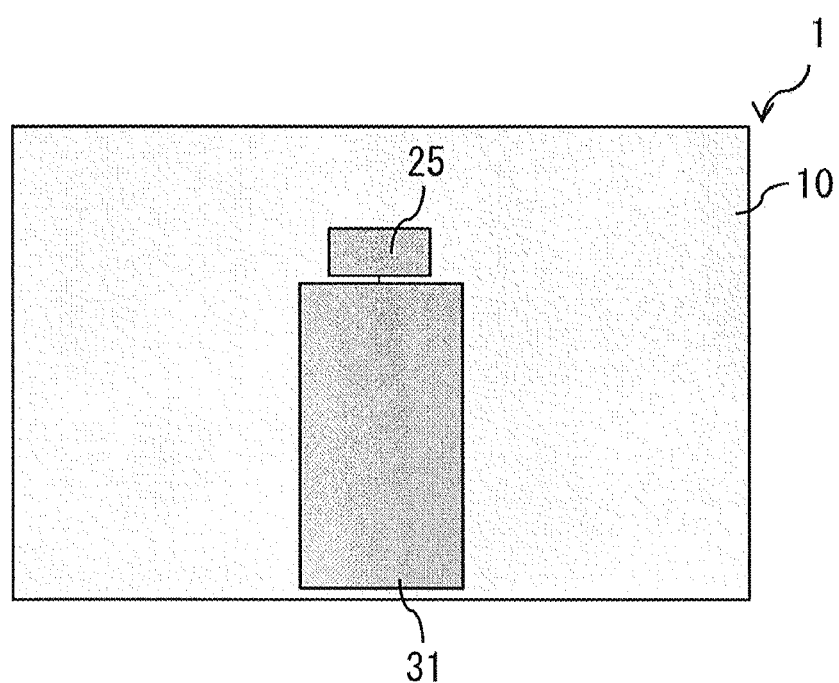

[ FIG. 34 ]
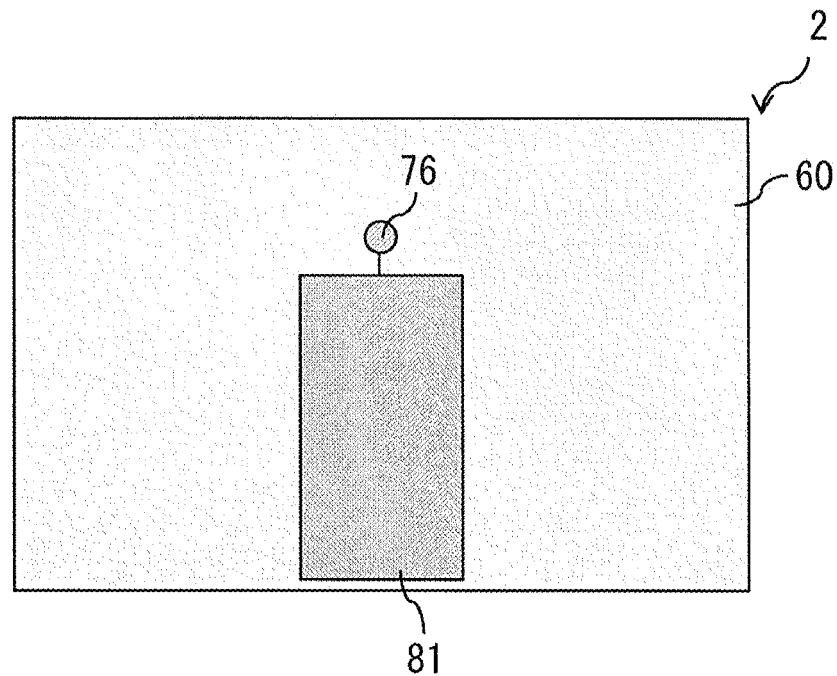
[ FIG. 35 ]
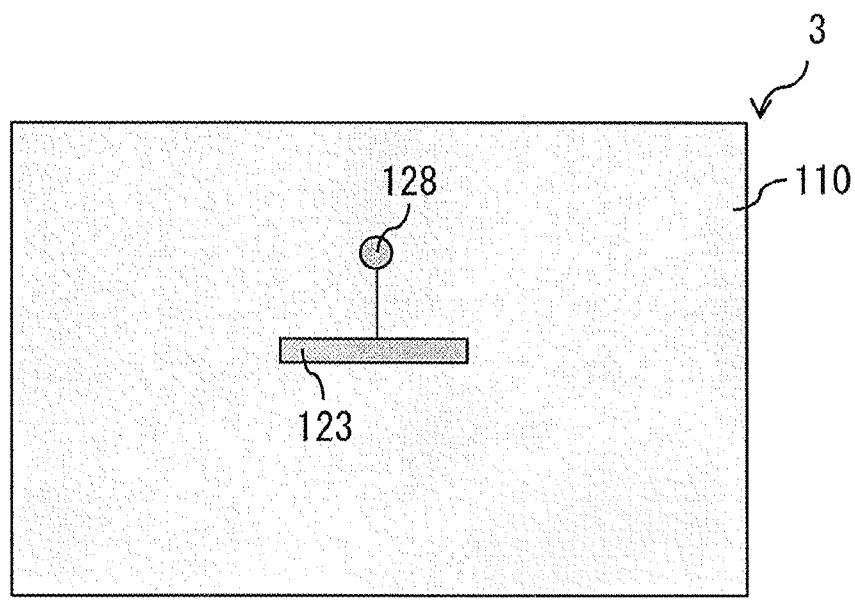

[ FIG. 36 ]
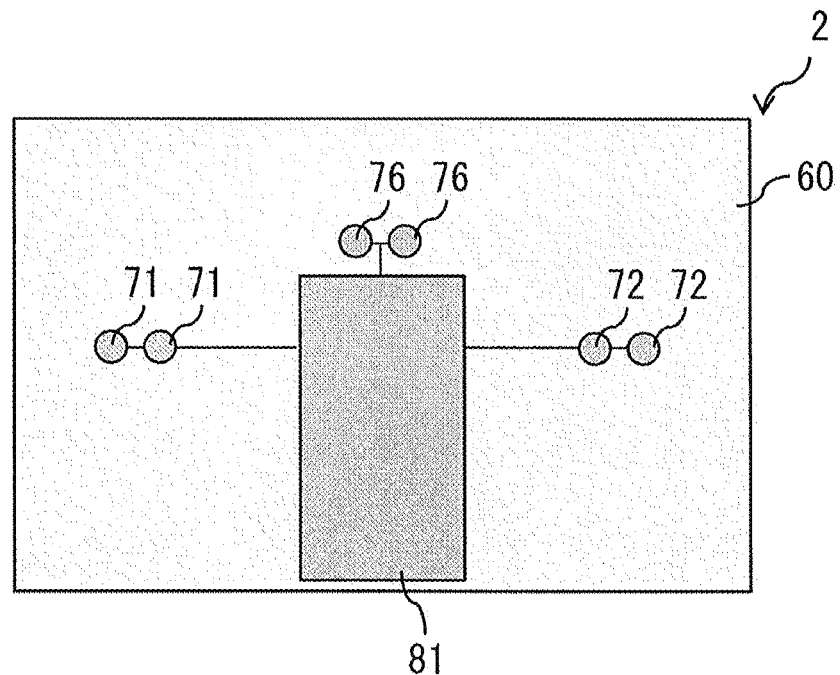
[ FIG. 37 ]
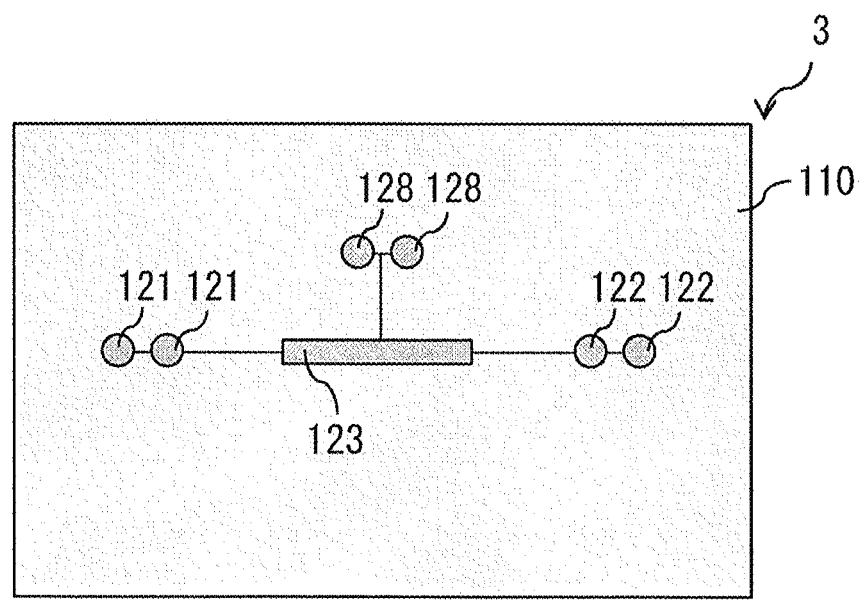

[ FIG. 38 ]
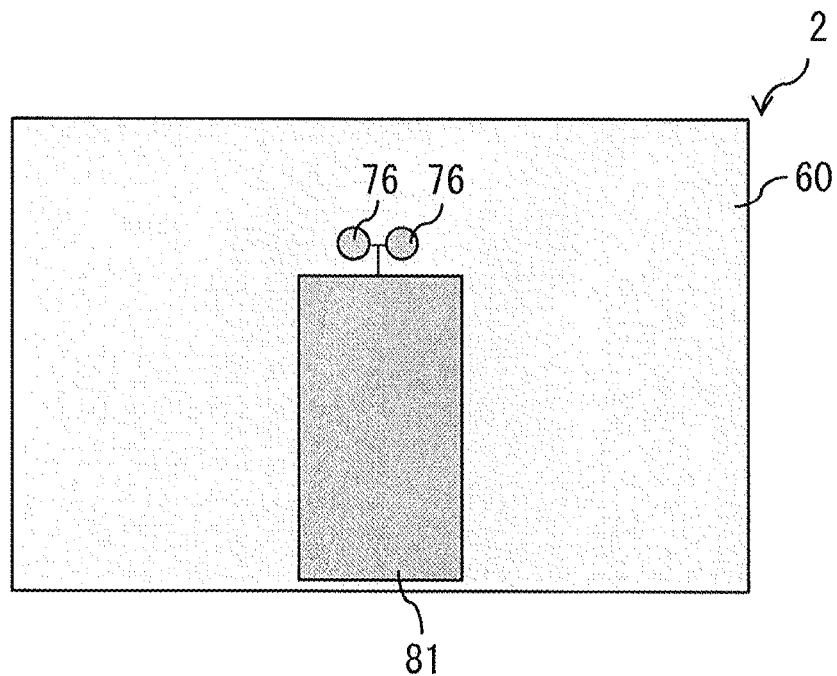
[ FIG. 39 ]
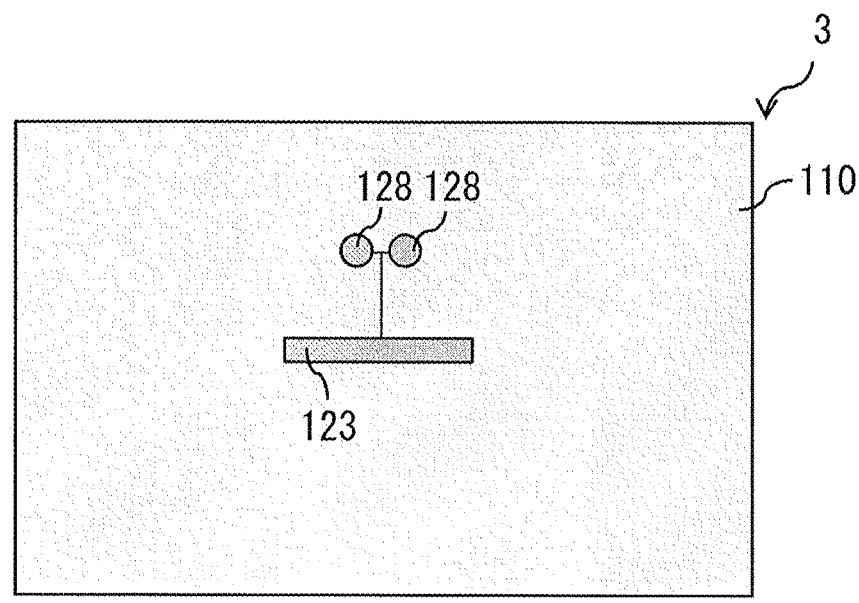

DISPLAY APPARATUS

CROSS-REFERENCE TO RELATED APPLICATIONS

This application is a national phase entry under 35 U.S.C. § 371 of International Application No. PCT/JP2017/040558 filed Nov. 10, 2017, which claims the priority from Japanese Patent Application No. 2016-253664 filed in the Japanese Patent Office on Dec. 27, 2016, and Japanese Patent Application No. 2017-099629 filed in the Japanese Patent Office on May 19, 2017, the entire contents of which are hereby incorporated by reference.

TECHNICAL FIELD

The present disclosure relates to a display apparatus.

BACKGROUND ART

Reduction in thickness and weight of a display device has been advancing rapidly. Accordingly, reduction in thickness and weight of a speaker have also advanced, and use of a flat panel speaker (FPS) instead of a cone-type speaker is proposed. Furthermore, it is also proposed to use a display panel as a diaphragm in the flat panel speaker. The flat panel speaker is disclosed for reference in PTLs 1 to 3, for example.

Patent Literature

PTL 1: Japanese Unexamined Patent Application Publication No. 2007-143010
PTL 2: Japanese Unexamined Patent Application Publication No. 2009-159104
PTL 3: Japanese Unexamined Patent Application Publication No. 2002-510182

SUMMARY OF THE INVENTION

However, there have been some cases where use of a display panel as a diaphragm in a flat panel speaker causes color unevenness in displayed images. Therefore, it is desirable to provide a display apparatus that allows for suppression of the color unevenness in the displayed images.

A display apparatus according to an embodiment of the present disclosure includes: a thin plate-shaped display cell that displays images and a plurality of exciters disposed on side of a back surface of the display cell and causing the display cell to vibrate. The plurality of exciters is such configured that the plurality of exciters is regarded as one exciter when the plurality of exciters generates vibration in the display cell.

In the display apparatus according to an embodiment of the present disclosure, the plurality of exciters, disposed on the back surface of the display cell, is such configured that the plurality of exciters is regarded as the one exciter when the plurality of exciters generates the vibration in the display cell. This prevents heat generated in the respective exciters from concentrating on one spot and distributes the heat to some extent, while blocking effects on sound quality.

Effect of the Invention

With a display apparatus according to an embodiment of the present disclosure, heat generated in each of exciters does not concentrate on one spot and is distributed to some extent while blocking effects on sound quality. Hence, it is possible to suppress color unevenness of displayed images due to local distribution of the heat. It is to be noted that the effects of the present technology are not necessarily limited to those described herein and may be any of the effects that are described herein.

BRIEF DESCRIPTION OF DRAWINGS

FIG. 1 is a diagram illustrating an example of a lateral surface configuration of a display apparatus according to a first embodiment of the present embodiment.
FIG. 2 is a diagram illustrating an example of a rear surface configuration of the display apparatus in FIG. 1.
FIG. 3 is a diagram illustrating an example of the rear surface configuration of the display apparatus in FIG. 2 when a back chassis is removed.
FIG. 4 is a diagram illustrating an example of a cross-sectional configuration taken along a line A-A in FIG. 3.
FIG. 5 is a diagram illustrating an example of the cross-sectional configuration taken along a line B-B in FIG. 3.
(A) of FIG. 6 is a diagram illustrating an example of a planar configuration of a printed circuit board coil in FIG. 5, and (B) of FIG. 6 is a diagram illustrating an example of a planar configuration of a flat magnet in FIG. 5.
(A) of FIG. 7 is a diagram illustrating a planar configuration of the printed circuit board coil in FIG. 5, and (B) of FIG. 7 is a diagram illustrating an example of the planar configuration of the flat magnet in FIG. 5.
FIG. 8 is a diagram illustrating an example of a layout of the printed circuit board coil, a vibration transmission member, and a heat dissipation sheet in FIG. 5.
FIG. 9 is a diagram illustrating a modification example of a lateral surface configuration of the display apparatus in FIG. 1.
FIG. 10 is a diagram illustrating an example of a rear surface configuration of the display apparatus in FIG. 9.
FIG. 11 is a diagram illustrating an example of a lateral surface configuration of a display apparatus according to a second embodiment of the present disclosure.
FIG. 12 is a diagram illustrating an example of a rear surface configuration of the display apparatus in FIG. 11.
FIG. 13 is a diagram illustrating an example of the rear surface configuration of the display apparatus in FIG. 12 when a back chassis is removed.
FIG. 14 is a diagram illustrating an example of a cross-sectional configuration taken along a line A-A in FIG. 13.
FIG. 15 is a diagram illustrating an example of a cross-sectional configuration taken along a line B-B in FIG. 13.
FIG. 16 is a diagram illustrating a modification example of the cross-sectional configuration taken along the line B-B in FIG. 13.
FIG. 17 is a diagram illustrating a modification example of the rear surface configuration of the display apparatus in FIG. 11.
FIG. 18 is a diagram illustrating a modification example of the rear surface configuration of the display apparatus in FIG. 11.
FIG. 19 is a diagram illustrating an example of the cross-sectional configuration of the display apparatus in FIG. 17 and FIG. 18.
FIG. 20 is a diagram illustrating an example of the cross-sectional configuration of the display apparatus in FIG. 17 and FIG. 18.
FIG. 21 is a diagram illustrating an example of a lateral surface configuration of a display apparatus according to a third embodiment of the present disclosure.

FIG. 22 is a diagram illustrating an example of a rear surface configuration of the display apparatus in FIG. 21.

FIG. 23 is a diagram illustrating an example of the rear surface configuration of the display apparatus in FIG. 22 when a back chassis is removed.

FIG. 24 is a diagram illustrating an example of a cross-sectional configuration taken along a line A-A in FIG. 23.

FIG. 25 is a diagram illustrating a modification example of the cross-sectional configuration taken along the line A-A in FIG. 24.

FIG. 26 is a diagram illustrating a modification example of the rear surface configuration of the display apparatus in FIG. 21.

FIG. 27 is a diagram illustrating a modification example of the rear surface configuration of the display apparatus in FIG. 21.

FIG. 28 is a diagram illustrating an example of a cross-sectional configuration of the display apparatus in FIG. 26 and FIG. 27.

FIG. 29 is a diagram illustrating an example of the cross-sectional configuration of the display apparatus in FIG. 26 and FIG. 27.

FIG. 30 is a diagram illustrating a modification example of the rear surface configuration in FIG. 13.

FIG. 31 is a diagram illustrating a modification example of the rear surface configuration in FIG. 13.

FIG. 32 is a diagram illustrating a modification example of the rear surface configuration in FIG. 23.

FIG. 33 is a diagram illustrating a modification example of the rear surface configuration in FIG. 30.

FIG. 34 is a diagram illustrating a modification example of the rear surface configuration in FIG. 31.

FIG. 35 is a diagram illustrating a modification example of the rear surface configuration in FIG. 32.

FIG. 36 is a diagram illustrating a modification example of the rear surface configuration in FIG. 31.

FIG. 37 is a diagram illustrating a modification example of the rear surface configuration in FIG. 32.

FIG. 38 is a diagram illustrating a modification example of the rear surface configuration in FIG. 34.

FIG. 39 is a diagram illustrating a modification example of the rear surface configuration in FIG. 35.

MODES FOR CARRYING OUT THE INVENTION

In the following, some embodiments of the present disclosure are described in detail with reference to the drawings. The following description is a specific example of the present disclosure. The present disclosure is not limited to the following embodiments.

1. First Embodiment

[Configuration]

Description is given of a display apparatus 1 according to a first embodiment of the present disclosure. FIG. 1 illustrates an example of a lateral surface configuration of the display apparatus 1 according to the present embodiment. FIG. 2 illustrates an example of a rear surface configuration of the display apparatus 1 in FIG. 1. The display apparatus 1 displays images on an image display surface 10A and outputs sound from the image display surface 10A. In other words, the display apparatus 1 has a built-in flat panel speaker in the image display surface 10A.

The display apparatus 1 includes, for example, a panel unit 10 and a shaking unit 20. The panel unit 10 displays images and functions as a diaphragm, and the shaking unit 20 is disposed on a back surface of the panel unit 10 and causes the panel unit 10 to vibrate. The display apparatus 1 further includes, for example, a signal processing unit 30 and a support unit 40. The signal processing unit 30 controls the shaking unit 20 and the support unit 40 supports the panel unit 10 via a rotary unit 50. The rotary unit 50 adjusts an angle of inclination of the panel unit 10 when the back surface of the panel unit 10 is supported by the support unit 40. The rotary unit 50 is configured by a hinge, that rotatably supports the panel unit 10 and the support unit 40, for example.

The shaking unit 20 and the signal processing unit 30 are disposed on the back surface of the panel unit 10. On side of the back surface of the panel unit 10, the panel unit 10 includes a back chassis 19 for protecting the panel unit 10, the shaking unit 20, and the signal processing unit 30. The back chassis 19 is configured by a plate-like metal plate or a resin plate, for example. The back chassis 19 is coupled to the rotary unit 50.

FIG. 3 illustrates a configuration example of a rear surface of the display apparatus 1 when the back chassis 19 is removed. FIG. 4 illustrates an example of a cross-sectional configuration taken along a line A-A in FIG. 3. FIG. 5 illustrates an example of the cross-sectional configuration taken along the line B-B in FIG. 3. It is to be noted that, although FIG. 5 exemplifies the cross-sectional configuration near a exciter 21 (actuator), to be described later, the cross-sectional configuration is similar to that near another exciter (exciter (actuator) 22, for example).

The panel unit 10 includes, for example, a thin plate-shaped display cell 11 that displays images, and an inner plate 12 (counter plate) that is disposed to face the display cell 11 with a gap 15 provided therebetween. A surface of the display cell 11 (surface on side opposite to the shaking unit 20) is the image display surface 10A. The display cell 11 has a plurality of display pixels disposed in matrix, for example. The plurality of display pixels is supported by a glass substrate provided in the display cell 11. That is, the display cell 11 includes the glass substrate, for example. The panel unit 10 further includes the glass substrate 13 and a fixing member 14. The glass substrate 13 is disposed to be in contact with a back surface of an inner plate 12 and the fixing member 14 is disposed between the display cell 11 and the inner plate 12.

The fixing member 14 has a function to fix the display cell 11 and the inner plate 12 to each other and a function as a spacer to maintain the gap 15. The fixing member 14 is disposed along an outer edge of the display cell 11, for example. The fixing member 14 may have flexibility of an extent that allows an edge of the display cell 11 to behave as a free end, for example, when the display cell 11 is vibrating. The fixing member 14 is configured by, for example, a sponge having adhesion layers on both sides.

The inner plate 12 is a substrate supporting the exciters 21 and 22 to be described later. The inner plate 12 has an opening at a part to install the exciters 21 or 22, for example. The glass substrate 13 is more rigid than the inner plate 12 and has a role to suppress bending or vibration of the inner plate 12. The glass substrate 13 has an opening at a position facing the opening of the inner plate 12. The opening provided in the glass substrate 13 is sized to allow the exciter 21 or the exciter 22 to be inserted. A resin substrate being equivalently rigid to the glass substrate 13 may be provided instead of the glass substrate 13.

The shaking unit 20 includes two exciters (exciters 21 and 22), for example. The exciter 21 and the exciter 22 have a configuration common to each other. The exciters 21 and 22 are disposed at any point in entire audio frequencies (20 Hz to 20 kHz, for example) other than a point that is most easy-to-vibrate when the exciters 21 and 22 generate vibration in the display cell 11. The exciters 21 and 22 are further disposed at any point in the entire audio frequencies other than a point that is most difficult-to-vibrate when the exciters 21 and 22 generate vibration in the display cell 11. The vibration of the display cell 11 is achieved, for example, by using a laser doppler vibrometer and measuring the vibration on a whole surface of the display cell 11 in the entire audio frequencies. The exciters 21 and 22 are disposed at points of indivisible ratios in a right-left direction and a top-bottom direction of the display cell 11. Examples of the "indivisible ratios" include 3:4, 5:7, 3:7, 2:5, 7:11, etc.

(A) and (B) of FIG. 6 are each an exploded view of a configuration example of the exciter 21. (A) and (B) of FIG. 7 are each an exploded view of another configuration example of the exciter 21. (A) and (B) of FIG. 6 each exemplify a case where the exciter 21 is configured by a minute exciter including a planar coil 21a2, to be described later, and a permanent magnet 21b2, to be described later. (A) and (B) of FIG. 7 each exemplify a case where the exciter 21 is configured by two minute exciters including the planar coil 21a2 and the permanent magnet 21b2. The exciter 21 is not limited to the description in (A) of FIG. 6, (B) of FIG. 6, (A) of FIG. 7, and (B) of FIG. 7, but may be configured by a plurality of minute exciters including the planar coil 21a2 and the permanent magnet 21b2, for example.

The exciter 21 is disposed close to the left when the display cell 11 is viewed from the back surface. The exciter 22 is disposed close to the right when the display cell 11 is viewed from the back surface. Each of the exciters 21 and 22, having a printed circuit board coil 21A and a flat magnet 21B, is an actuator for a speaker which is a source of vibration. The printed circuit board coil 21A and the flat magnet 21B face each other with a predetermined gap provided therebetween.

As illustrated in (A) of FIG. 6, for example, the printed circuit board coil 21A includes the printed circuit board 21a1 mounted with the one planar coil 21a2 (voice coil). The printed circuit board 21a1 has wiring coupled to the planar coil 21a2. The planar coil 21a2 is fixed to the back surface of the display cell 11 via a vibration transmission member 23 and a heat dissipation sheet 24. The vibration transmission member 23 and the heat dissipation sheet 24 are described later. In the exciter 21 and the exciter 22, the planar coil 21a2 is formed on a surface of the printed circuit board 21a1, for example, the surface being opposite to the display cell 11. As illustrated in (B) of FIG. 6, the flat magnet 21B is a magnetic circuit having the permanent magnet 21b2 and a support substrate 21b1 that supports the permanent magnet 21b2. The permanent magnet 21b2 faces the planar coil 21a2 with a predetermined gap provided therebetween.

As illustrated in (A) of FIG. 7, for example, the printed circuit board coil 21A may have the printed circuit board 21a1 in which the plurality of planar coils 21a2 (voice coils) is mounted. The printed circuit board 21a1 has the wiring coupling the plurality of planar coils 21a2 in series to each other. The plurality of planar coils 21a2 is fixed to the back surface of the display cell 11 via the vibration transmission member 23 and the heat dissipation sheet 24. The vibration transmission member 23 and the heat dissipation sheet 24 are described later. In the exciter 21 and the exciter 22, the plurality of planar coils 21a2 is, for example, formed on the surface of the printed circuit board 21a1, the surface being opposite to the display cell 11. As illustrated in (B) of FIG. 7, for example, the flat magnet 21B may be the magnetic circuit having the plurality of permanent magnets 21b2 and the support substrate 21b2 supporting the plurality of permanent magnets 21b2. The plurality of permanent magnets 21b2 faces the plurality of planar coils 21a2 with the predetermined gap provided therebetween. In the plurality of permanent magnets 21b2 on the support substrate 21b1, N pole and S pole of the two permanent magnets 21b2 being adjacent to each other face opposite directions to each other.

In a case where a voice current of an electric signal flows in each of the planar coils 21a2, the exciters 21 and 22 each generate a driving force in each of the planar coils 21a2 in accordance with a principle of electromagnetic action. The driving force is transmitted to the display cell 11 via the vibration transmission member 23, generating vibration in the display cell 11 in accordance with a change in the voice current, vibrating air, and changing a sound pressure.

The shaking unit 20 further includes the vibration transmission member 23 and the heat dissipation sheet 24 for each of the exciters (exciters 21 and 22), for example.

The heat dissipation sheet 24 is provided between the display cell 11 and each of the exciters (exciter 21 and exciter 22). The heat dissipation sheet 24 is laminated on the back surface of the display cell 11. It is preferable that the heat dissipation sheet 24 have a function (high thermal conductance) to dissipate the heat generated from the exciter 21 or the exciter 22, and be configured by a material that makes it possible to efficiently transmit vibration of sound to the display cell 11. The heat dissipation sheet 24 is configured by a thin film made of a metal (aluminum, for example). The heat dissipation sheet 24 is configured by the thin film of an aluminum alloy, for example.

The vibration transmission member 23 is in contact with, for example, the heat dissipation sheet 24 and the printed circuit board 21a1 of the exciter 21 or the exciter 22, and is fixed to the heat dissipation sheet 24 and the printed circuit board 21a1 of the exciter 21 or the exciter 22. The vibration transmission member 23 is configured by a member having a characteristic of repelling at least in a sound wave region (20 Hz or higher). The vibration transmission member 23 is configured by, for example, a thermoset resin, a double-faced tape, or low repulsive urethane, etc. In a case where the vibration transmission member 23 is configured by the thermoset resin, the vibration transmission member 23 is formed by, for example, energizing the respective planar coils 21a2 to generate heat in the respective planar coils 21a2 and hardening the thermoset resin with the heat. In a case where the vibration transmission member 23 is configured by the double-faced tape, the vibration transmission member 23 is fixed to the heat dissipation sheet 24 and the printed circuit board 21a1 of the exciter 21 or the exciter 22, for example, by inputting a certain pulse signal to the respective planar coils 21a2 and pressing the double-faced tape strongly with the respective planar coils 21a2. In a case where the vibration transmission member 23 is configured by the low repulsive urethane, the low repulsive urethane preferably has the characteristic of repelling in the sound wave region (20 Hz or higher) and a characteristic of following a low frequency region (less than 20 Hz). This makes it possible for the low repulsive urethane to follow displacement of the display cell 11 due to impact from outside, without attenuating the vibration of sound.

[Effects]

In the following, description is given of effects of the display apparatus 1 according to the present embodiment.

Reduction in thickness and weight of a display device has been advancing rapidly. Accordingly, reduction in thickness and weight of a speaker have also advanced, and use of a flat panel speaker (FPS) in place of a cone-type speaker is proposed. Furthermore, it is also proposed to use a display panel as a diaphragm in the flat panel speaker.

However, there have been some cases where use of a display panel as a diaphragm in a flat panel speaker causes color unevenness in displayed images.

On the one hand, in the display apparatus 1 according to the present embodiment, the plurality of exciters (minute exciters in the exciter 21 or the exciter 22) disposed on the side of the back surface of the display cell 11 is such configured that the plurality of exciters (minute exciters in the exciter 21 or the exciter 22) is regarded as one exciter when vibration is generated in the display cell 11 by the plurality of exciters (minute exciters in the exciter 21 or the exciter 22). Specifically, the plurality of planar coils 21$a$2 is fixed to the common printed circuit board 21$a$1 and the printed circuit board 21$a$1 is fixed to the back surface of the display cell 11. This prevents the heat generated in each of the exciters from concentrating on one spot and distributes the heat to some extent, while blocking effects on sound quality. As a result, it is possible to suppress the color unevenness of the displayed images due to local distribution of the heat.

In addition, in the display apparatus 1 according to the present embodiment, the plurality of heat dissipation sheets 24 is provided between the display cell 11 and the respective exciters (exciter 21 and exciter 2). Furthermore, in the respective exciters (exciter 21 and exciter 2), the plurality of planar coils 21$a$2 is provided on the back surface of the display cell 11 via the heat dissipation sheets 24. This causes the heat generated in the respective planar coils 21$a$2 to be dissipated to the outside via the heat dissipation sheets 24. Furthermore, the plurality of planar coils 21$a$2 is disposed in a plane parallel to the back surface of the display cell 11, and thus the heat generated in the respective planar coils 21$a$2 does not concentrate on one spot and is distributed to some extent. As a result, it is possible to suppress the color unevenness of the displayed images due to the local distribution of the heat.

In addition, in the display apparatus 1 according to the present embodiment, in the respective exciters (exciter 21 and exciter 22), the plurality of planar coils 21$a$2 is formed on the surface of the printed circuit board 21$a$1, the surface being opposite to the display cell 11. With this, the printed circuit board 21$a$1 forms a gap between each of the heat dissipation sheets 24 and each of the planer coils 21$a$2, and thus the printed circuit board 21$a$1 secures a path of a magnetic field, the path being formed when currents flow in the respective planar coils 21$a$2. As a result, it is possible to suppress the color unevenness of the displayed images due to the local distribution of the heat.

<2. Modification Example of First Embodiment>

In the foregoing embodiment, as illustrated in FIG. 9 and FIG. 10, for example, the support unit 40 and the rotary unit 50 may be omitted. In this case, however, it is preferable that a concave portion 32 for hanging the display apparatus 1 on a hook provided on a wall, for example, be provided in the back chassis 19.

3. Second Embodiment

[Configuration]

In the following, description is given of a display apparatus 2 according to a second embodiment of the present disclosure. FIG. 11 illustrates an example of a lateral surface configuration of the display apparatus 2 according to the present embodiment. FIG. 12 illustrates an example of a rear surface configuration of the display apparatus 2 in FIG. 11. The display apparatus 2 displays images on an image display surface 60A and outputs sound from the image display surface 60A. In other words, the display apparatus 2 has a built-in flat panel speaker in the image display surface 60A.

The display apparatus 2 includes, for example, a panel unit 60 and a shaking unit 70. The panel unit 60 displays images and functions as a diaphragm, and the shaking unit 70 is disposed on a back surface of the panel unit 60 and causes the panel unit 60 to vibrate. The display apparatus 2 further includes, for example, a signal processing unit 80 and a support unit 90, the signal processing unit 80 controlling the shaking unit 70 and the support unit 90 supporting the panel unit 60 via a rotary unit 100. The rotary unit 100 adjusts an angle of inclination of the panel unit 60 when the back surface of the panel unit 60 is supported by the support unit 90. The rotary unit 100 is configured by a hinge, for example, that rotatably supports the panel unit 60 and the support unit 90.

The shaking unit 70 and the signal processing unit 80 are disposed on the back surface of the panel unit 60. On side of the back surface of the panel unit 60, the panel unit 60 includes a back chassis 69 for protecting the panel unit 60, the shaking unit 70, and the signal processing unit 80. The back chassis 69 is configured by, for example, a plate-like metal plate or a resin plate. The back chassis 69 is coupled to the rotary unit 100.

FIG. 13 illustrates a configuration example of a rear surface of the display apparatus 2 when the back chassis 69 is removed. FIG. 14 illustrates an example of a cross-sectional configuration taken along a line A-A in FIG. 13. FIG. 15 illustrates an example of the cross-sectional configuration taken along the line B-B in FIG. 3. It is to be noted that although FIG. 15 exemplifies the cross-sectional configuration near a exciter 71 (actuator), to be described later, the cross-sectional configuration is similar to that near another exciter (exciter(actuator) 72, for example).

The panel unit 60 includes, for example, a thin plate-shaped display cell 61 that displays images and an inner plate 62 (counter plate) that is disposed to face the display cell 61 with a gap 65 provided therebetween. A surface of the display cell 61 (surface on side opposite to the shaking unit 70) is the image display surface 60A. The display cell 61 has a plurality of display pixels disposed in matrix, for example. The plurality of display pixels is supported by a glass substrate provided on the display cell 61. That is, the display cell 61 includes the glass substrate, for example. The panel unit 60 further includes the glass substrate 13 and a fixing member 64. The glass substrate 13 is disposed to be in contact with a back surface of an inner plate 62 and the fixing member 64 is disposed between the display cell 61 and the inner plate 62.

The fixing member 64 has a function to fix the display cell 61 and the inner plate 62 to each other and a function as a spacer to maintain the gap 65. The fixing member 64 is disposed along an outer edge of the display cell 61, for example. The fixing member 64 may have flexibility of an extent that allows an edge of the display cell 61 to behave as a free end, for example, when the display cell 61 is vibrating. The fixing member 64 is configured by, for example, a buffer layer such as the sponge having adhesion layers on both sides.

The inner plate 62 is a substrate supporting exciter 71 and a exciter 72, to be described later (specifically, a housing 71A to be described layer). The inner plate 62 has an opening at a part to install the exciter 71 or 72, and has a convex portion 62A for supporting the exciters 71 and 72 in a periphery of the opening. The convex portion 62A protrudes to side opposite to the display cell 61. The glass substrate 63 is more rigid than the inner plate 62, and has a role to suppress the bending or the vibration of the inner plate 62. The glass substrate 63 has an opening at a position facing the convex portion 62A. The opening provided in the glass substrate 63 is sized to allow the exciter 71 or the exciter 72 to be inserted. A resin substrate being rigid equivalent to the glass substrate 63 may be provided instead of the glass substrate 63.

The shaking unit 70 includes two exciters (exciter 71 and exciter 72), for example. The exciter 71 and the exciter 72 have a configuration common to each other. The exciters 71 and 72 are disposed at any point in the entire audio frequencies (20 Hz to 20 kHz, for example) other than the point that is most easy-to-vibrate when the exciters 711 and 72 generate vibration in the display cell 61. The exciters 71 and 72 are further disposed at any point in the entire audio frequencies other than the point that is most difficult-to-vibrate when the exciters 71 and 72 generate vibration in the display cell 61. The vibration of the display cell 61 is achieved by using the laser doppler vibrometer and measuring the vibration on a whole surface of the display cell 61 in the entire audio frequencies. The exciters 71 and 72 are disposed at the points of indivisible ratios in the right-left direction and the top-bottom direction of the display cell 61. Examples of the "indivisible ratios" include 3:4, 5:7, 3:7, 2:5, 7:11, etc.

The exciter 71 is disposed close to the left when the display cell 61 is viewed from the back surface. The exciter 72 is disposed close to the right when the display cell 61 is viewed from the back surface. Each of the exciters 71 and 72, having, for example, a voice coil, a bobbin for winding the voice coil therearound, and a magnetic circuit, is the actuator for the speaker which is the source of vibration. Furthermore, each of the exciters 71 and 72 includes a housing 71A that holds the voice col and the bobbin so as to allow the voice coil and the bobbin to vibrate and accommodates the magnetic circuit. The housing 71A is made by die-casting (aluminum die-casting, for example) and excellent in heat dissipation. The housing 71A has a plurality of screw holes 73a for causing screws to be inserted, the screws being used, for example, when the housing 71A is fixed to the convex portion 62A. In each of the exciters (exciter 71 and exciter 72), the housing 71A is fixed to the inner plate 62.

In a case where a voice current of an electric signal flows in the voice coil, the exciters 71 and 72 each generate a driving force in the voice coil in accordance with the principle of electromagnetic action. The driving force is transmitted to the display cell 61 via a vibration transmission member 73, generating vibration in the display cell 61 in accordance with a change in the voice current, vibrating air, and changing a sound pressure.

The shaking unit 70 further includes the vibration transmission member 73 for each of the exciters (exciters 71 and 72), for example.

The vibration transmission member 73 is in contact with, for example, the back surface of the display cell 61 and the bobbin of the exciter 71 or the exciter 72, and is fixed to the back surface of the display cell 61 and the bobbin of the exciter 71 or the exciter 72. The vibration transmission member 73 is configured by a member having the characteristic of repelling at least in a sound wave region (20 Hz or higher). The vibration transmission member 73 is configured by, for example, the thermoset resin, the double-faced tape, or the low repulsive urethane, etc. In a case where the vibration transmission member 73 is configured by the thermoset resin, the vibration transmission member 73 is formed by, for example, energizing the voice coil to generate heat in the voice coil and hardening the thermoset resin with the heat. In a case where the vibration transmission member 73 is configured by the double-faced tape, the vibration transmission member 73 is fixed to the back surface of the display cell 61 and the bobbin of the exciter 71 or the exciter 72, for example, by inputting a certain pulse signal to the voice coil and pressing the double-faced tape strongly with the voice coil. In a case where the vibration transmission member 73 is configured by the low repulsive urethane, the low repulsive urethane preferably has the characteristic of repelling in the sound wave region (20 Hz or higher) and the characteristic of following the low frequency region (less than 20 Hz). This makes it possible to follow displacement of the display cell 61 due to impact from outside, without attenuating the vibration of sound.

[Effects]

In the display apparatus 2 according to the present embodiment, the housing 71A of each of the exciters (exciters 71 and 72) is made by die-casting. This causes the heat generated in each of the exciters (exciters 71 and 72) to be dissipated from the housing 71A quickly to the outside. As a result, it is possible to suppress the color unevenness of the displayed images due to the local distribution of the heat.

In addition, in the present embodiments, each of the exciters (exciters 71 and 72) is fixed to the inner plate 62, the inner plate 62 being disposed to face the display cell 61 with a predetermined gap 65 provided therebetween. This makes it possible to efficiently transmit the vibration of the respective exciters (exciters 71 and 72) to the display cell 61.

<4. Modification Example of Second Embodiment>

[Modification Example A]

In the second embodiment, as illustrated in FIG. 16, for example, there may be provided a heat dissipation sheet 74 between the display cell 61 and each of the exciters (exciters 71 and 72).

The heat dissipation sheet 74 is laminated on the back surface of the display cell 61. It is preferable that the heat dissipation sheet 74 have the function (high thermal conductance) to dissipate the heat generated from the exciter 71 or the exciter 72, and be configured by the material that makes it possible to efficiently transmit the vibration of sound to the display cell 61. The heat dissipation sheet 74 is configured by the thin film made of the metal (aluminum, for example). The heat dissipation sheet 74 is configured by the thin film of an aluminum alloy, for example. The vibration transmission member 73 is in contact with, for example, the heat dissipation sheet 74 and the bobbin of the exciter 71 or the exciter 72, and is fixed to the heat dissipation sheet 74 and the bobbin of the exciter 71 or the exciter 72.

In the modification example, the plurality of heat dissipation sheets 74 is provided between the display cell 61 and each of the exciters (exciters 71 and 72). This causes the heat generated in the respective exciters (exciters 71 and 72) to be dissipated to the outside via the heat dissipation sheets 74. Thereby, the heat generated in the respective exciters (exciters 71 and 72) does not concentrate on one spot and is distributed to some extent. As a result, it is possible to suppress the color unevenness of displayed images due to the local distribution of the heat.

[Modification Example B]

In the second embodiment and the modification examples thereof, as illustrated in FIG. 17, FIG. 18, FIG. 19, and FIG.

20, for example, the shaking unit 70 may include the plurality of exciters 71 and the plurality of exciters 72. It is to be noted that FIG. 17 exemplifies a case where the two exciters 71 and the two exciters 72 are provided. In addition, FIG. 18 exemplifies a case where the three shakes 71 and the three exciters 72 are provided. In addition, FIG. 19 exemplifies a case where the exciters 71 and 72 are fixed to the display cell 61 via the vibration transmission members 73. In addition, FIG. 20 exemplifies a case where the exciters 71 and 72 are fixed to the display cell 61 via the vibration transmission members 73 and the heat dissipation sheet 74. FIG. 19 and FIG. 20 illustrate an example of a cross-sectional configuration of the panel unit 60 illustrated in FIG. 17 and FIG. 18.

The plurality of exciters 71 vibrates the display cell 61 and is disposed on the back surface of the display cell 61. The plurality of exciters 71 are disposed close to the left when the display cell 61 is viewed from the back surface. The plurality of exciters 72 vibrates the display cell 61 and is disposed on the back surface of the display cell 61. The plurality of exciters 72 is disposed close to the right when the display cell 61 is viewed from the back surface.

In the modification example, the plurality of exciters 71 disposed on the side of the back surface of the display cell 61 is such configured that the plurality of exciters 71 is regarded as one exciter when vibration is generated in the display cell 61 by the plurality of exciters 71. Specifically, each of the plurality of exciters 71 is able to vibrate the display cell 61 independently of each other and disposed in a region a maximum width of which is less than or equal to a half wavelength of 20 kHz. For example, sound velocity in the glass substrate included in the display cell 61 is approximately 4000 m/second to 5000 m/second and a wavelength at a maximum value of a voice band (20 kHz, for example) has a length of 20 to 25 cm. Therefore, in a case where the plurality of exciters 71 or the plurality of exciters 72 is disposed in the region (a region 71d in FIG. 19 and FIG. 20) less than or equal to the half wavelength of 20 kHz, in the glass substrate included in the display cell 61, it is possible to regard as the plurality of exciters 71 or the plurality of exciters 72 to be one sound source. This makes it possible to improve the sound quality while distributing the heat generated in the respective exciters 71 and 72 to some extent.

5. Third Embodiment

[Configuration]

Next, description is given of a display apparatus 3 according to a fourth embodiment of the present disclosure. FIG. 21 illustrates an example of a lateral surface configuration of the display apparatus 3 according to the present embodiment. FIG. 22 illustrates an example of a rear surface configuration of the display apparatus 3 in FIG. 21. The display apparatus 3 displays images on an image display surface 110A and outputs sound from the image display surface 110A. In other words, the display apparatus 3 has a built-in flat panel speaker in the image display surface 110A.

The display apparatus 3 includes, for example, a panel unit 110 and a shaking unit 120. The panel unit 110 displays images and functions as a diaphragm, and the shaking unit 120 is disposed on a back surface of the panel unit 110 and causes the panel unit 110 to vibrate. The display apparatus 3 further includes, for example, a support unit 130 in which a signal processing circuit 131 is built in, the signal processing circuit 131 controlling the shaking unit 120. The support unit 130 is fixed to a back chassis 119 via a rotary unit 140. The rotary unit 140 adjusts an angle of inclination of the panel unit 110 when the back surface of the panel unit 110 is supported by the support unit 130. The rotary unit 140 is configured by a hinge, for example, that rotatably supports the panel unit 110 and the support unit 130.

FIG. 23 illustrates an example of a rear surface configuration of the display apparatus 3 when the back chassis 119 is removed. FIG. 24 illustrates an example of a cross-sectional configuration taken along a line A-A in FIG. 23. The panel unit 110 includes, for example, a thin plate-shaped display cell 111 that displays images. A surface of the display cell 111 (surface on side opposite to the shaking unit 120) is the image display surface 110A. The display cell 111 has a plurality of display pixels disposed in matrix, for example. The plurality of display pixels is supported by a glass substrate provided on the display cell 111. That is, the display cell 111 includes the glass substrate, for example.

The shaking unit 120 includes two exciters (exciter 121 (actuator) and exciter 122 (actuator)), for example. The exciter 121 and the exciter 122 have a configuration common to each other. The exciters 121 and 122 are disposed at any point in the entire audio frequencies (20 Hz to 20 kHz, for example) other than the point that is most easy-to-vibrate when the exciters 121 and 122 generate vibration in the display cell 111. The exciters 121 and 122 are further disposed at any point in the entire audio frequencies other than the point that is most difficult-to-vibrate when the exciters 121 and 122 generate vibration in the display cell 111. The vibration of the display cell 111 is achieved by using the laser doppler vibrometer and measuring the vibration on a whole surface of the display cell 111 in the entire audio frequencies. The exciters 121 and 122 are disposed at the points of indivisible ratios in the right-left direction and the top-bottom direction of the display cell 111. Examples of the "indivisible ratios" include 3:4, 5:7, 3:7, 2:5, 7:11, etc.

The exciter 121 is disposed close to the left when the display cell 111 is viewed from the back surface. The exciter 122 is disposed close to the right when the display cell 111 is viewed from the back surface. The shaking unit 120 further includes a wiring substrate 123 electrically coupling the two exciters (exciters and 122) and the signal processing circuit 131. A flexible wiring substrate, for example, is coupled to the wiring substrate 123 and the two exciters (exciters 121 and 122) and the signal processing circuit 131 are electrically coupled via the flexible wiring substrate.

Each of the exciters 121 and 122, having, for example, the voice coil, the bobbin for winding the voice coil therearound, and the magnetic circuit, is the actuator for the speaker which is the source of vibration. Furthermore, each of the exciters 121 and 122 includes a housing 121A that holds the voice col and the bobbin so as to allow the voice coil and the bobbin to vibrate and accommodates the magnetic circuit. The housing 121A is made by die-casting (aluminum die-casting, for example) and excellent in heat dissipation.

In a case where a voice current of an electric signal flows in the voice coil, the exciters 121 and 122 each generate the driving force in the voice coil in accordance with the principle of electromagnetic action. The driving force is transmitted to the display cell 111 via a vibration transmission member 125, generating vibration in the display 111 in accordance with a change in the voice current, vibrating air, and changing a sound pressure.

The shaking unit 120 further includes a fixing member 124 and the vibration transmission member 125 for each of the exciters (exciters 121 and 122), for example. Each of the exciters (exciters 121 and 122) are fixed to the back surface of the display cell 111 via the fixing member 124. Each of the respective exciters (exciters 121 and 122) is fixed by the fixing member 124 to a position that is different from a position facing the exciters (exciters 121 and 122), with respect to the back surface of the display cell 111. The fixing member 124 has a function to fix the display cell 111 and the housing 121A to each other. The fixing member 124 may have flexibility of an extent not attenuating vibration of the display cell 111 while the display cell 111 is vibrating. The fixing member 124 is configured by, for example, the sponge having the adhesion layers on both sides.

The vibration transmission member 125 is in contact with, for example, the back surface of the display cell 111 and the bobbin of the exciter 121 or the exciter 122 and is fixed to the back surface of the display cell 111 and the bobbin of the exciter 121 or the exciter 122. The vibration transmission member 125 is configured by a member having the characteristic of repelling at least in the sound wave region (20 Hz or higher). The vibration transmission member 125 is configured by, for example, the thermoset resin, the double-faced tape, or the low repulsive urethane, etc. In a case where the vibration transmission member 125 is configured by the thermoset resin, the vibration transmission member 125 is formed by, for example, energizing the voice coil to generate heat in the voice coil and hardening the thermoset resin with the heat. In a case where the vibration transmission member 125 is configured by the double-faced tape, the vibration transmission member 125 is fixed to the back surface of the display cell 111 and the bobbin of the exciter 121 or the exciter 122, for example, by inputting a certain pulse signal to the voice coil and pressing the double-faced tape strongly with the voice coil. In a case where the vibration transmission member 125 is configured by the low repulsive urethane, the low repulsive urethane preferably has the characteristic of repelling in the sound wave region (20 Hz or higher) and of the characteristic of following the low frequency region (less than 20 Hz). This makes it possible to follow displacement of the display cell 111 due to impact from outside, without attenuating the vibration of sound.

[Effects]

In the display apparatus 3 according to the present embodiment, the housing 121A of each of the exciters (exciters 121 and 122) is made by die-casting. This causes the heat generated in each of the exciters (exciters 121 and 122) to be dissipated from the housing 121A quickly to the outside. As a result, it is possible to suppress the color unevenness of the displayed images due to the local distribution of the heat.

In the present embodiment, in each of the exciters (exciters 121 and 122), the housing 121A is fixed to a position that is different from a position facing the exciters (exciters 121 and 122), with respect of the back surface of the display cell 111. With this, the respective exciters (exciters 121 and 122) vibrate together with the display cell 111, which thus makes amplitude caused by resonance larger and makes it possible to increase output in the low frequency region.

<6. Modification Example of Third Embodiment>

[Modification Example C]

In the third embodiment, as illustrated in FIG. 25, for example, a heat dissipation sheet 126 may be provided between the display cell 111 and each of the exciters (exciters 121 ad 122).

The heat dissipation sheet 126 is laminated on the back surface of the display cell 111. It is preferable that the heat dissipation sheet 126 have the function (high thermal conductance) to dissipate the heat generated from the exciter 121 or the exciter 122, and be configured by the material that makes it possible to efficiently transmit the vibration of sound to the display cell 111. The heat dissipation sheet 126 is configured by, for example, the thin film made of the metal (aluminum, for example). The heat dissipation sheet 126 is configured by the thin film of the aluminum alloy, for example. The vibration transmission member 125 is in contact with, for example, the heat dissipation sheet 126 and the bobbin of the exciter 121 or the exciter 122, and is fixed to the heat dissipation sheet 126 and the bobbin of the exciter 121 or the exciter 122.

In the modification example, the plurality of heat dissipation sheets 126 is provided between the display cell 111 and the respective exciters (exciters 121 and 122). This causes the heat generated in the respective exciters (exciters 121 and 1222) to be dissipated to the outside via the heat dissipation sheets 126. Thereby, the heat generated in the respective exciters (exciters 121 and 122) does not concentrate on one spot and is distributed to some extent. As a result, it is possible to suppress the color unevenness of displayed images due to the local distribution of the heat.

[Modification Example D]

In the third embodiment and the modification examples thereof, as illustrated in FIG. 26, FIG. 27, FIG. 28, and FIG. 29, the shaking unit 120 may include the plurality of exciters 121 and the plurality of exciters 122. It is to be noted that FIG. 26 exemplifies a case where the two exciters 121 and the two exciters 122 are provided. In addition, FIG. 27 exemplifies a case where the three exciters 121 and the three exciters 122 are provided. In addition, FIG. 28 exemplifies a case where the exciters 121 and 122 are fixed to the display cell 111 via the vibration transmission members 125. In addition, FIG. 29 exemplifies a case where the exciters 121 and 122 are fixed to the display cell 111 via the vibration transmission members 125 and the heat dissipation sheets 126. FIG. 28 and FIG. 29 illustrate an example of the cross-sectional configuration of the panel unit 110 illustrated in FIG. 26 and FIG. 27.

The plurality of exciters 121 vibrates the display cell 111 and is disposed on the back surface of the display cell 111. The plurality of exciters 121 is disposed close to the left when the display cell 111 is viewed from the back surface. The plurality of exciters 122 vibrates the display cell 111 and is disposed on the back surface of the display cell 111. The plurality of exciters 122 is disposed close to the right when the display cell 111 is viewed from the back surface.

In the modification example, the plurality of exciters 121 disposed on the side of the back surface of the display cell 111 is such configured that the plurality of exciters 121 is regarded as one exciter when vibration is generated in the display cell 111 by the plurality of exciters 121. Specifically, each of the plurality of exciters 121 is able to vibrate the display cell 111 independently of each other and disposed in the region the maximum width of which is less than or equal to the half wavelength of 20 kHz. For example, the sound velocity in the glass substrate included in the display cell 111 is approximately 4000 m/second to 5000 m/second and the wavelength at the maximum value of the voice band (20 kHz, for example) has the length of 20 to 25 cm. Therefore, in a case where the plurality of exciters 121 or the plurality of exciters 122 is disposed in the region (a region 121$d$ in FIG. 28 and FIG. 29) less than or equal to the half wavelength of 20 kHz, in the glass substrate included in the display cell 111, it is possible to regard as the plurality of exciters 121 or the plurality of exciters 122 to be one sound source. This makes it possible to improve the sound quality while distributing the heat generated in the respective exciters 121 and 122 to some extent.

<7. Modification Example Common to Respective Embodiments>
[Modification Example E]

In the respective embodiments and the modification examples thereof, the number of the exciters may be three or more. For example, in the foregoing first embodiment and the modification example thereof, as illustrated in FIG. 30, for example, a exciter 20 may have three exciters (exciters 21, 22, and 25). In this case, the third exciter (exciter 25 (actuator)) is located between the exciter 21 and the exciter 22. The exciter 25 has a similar configuration to that of the exciter 21. In addition, for example, in the foregoing second embodiment and the modification example thereof, as illustrated in FIG. 31, for example, a exciter 70 may have three exciters (exciters 71, 72, and 76). In this case, the third exciter (exciter 76 (actuator)) is located between the exciter 71 and the exciter 72. The exciter 76 has a similar configuration to the exciter 71. In addition, for example, in the foregoing third embodiment and the modification examples thereof, as illustrated in FIG. 32, for example, a exciter 120 may have three exciters (exciters 121, 122, and 128). In this case, the third exciter (exciter 128 (actuator)) is located between the exciter 121 and the exciter 122. The exciter 128 has a similar configuration to the exciter 121. In the modification example, it is also possible to achieve effects similar to those in the foregoing respective embodiments and the modification examples thereof.

[Modification Example F]

In the foregoing respective embodiments and the modification examples thereof, the number of exciters may be one. For example, as illustrated in FIG. 33, the exciter 20, for example, may have one exciter (exciter 25). In addition, for example, as illustrated in FIG. 34, the exciter 70, for example, may have the one exciter (exciter 76). In addition, for example, as illustrated in FIG. 35, the exciter 120, for example, may have the one exciter (exciter 128). In the modification example, it is also possible to achieve effects similar to those in the foregoing respective embodiments and the modification examples thereof.

[Modification Example G]

In the foregoing modification example E, as illustrated in FIG. 36, for example, the exciter 70 may have the plurality of exciters 71, the plurality of exciters 72, and the plurality of exciters 76. Then, the plurality of exciters 71 is such configured that the plurality of exciters 71 is regarded as one exciter when vibration is generated in the display cell 61 by the plurality of exciters 71. In addition, the plurality of exciters 72 is such configured that the plurality of exciters 72 is regarded as one exciter when vibration is generated in the display cell 61 by the plurality of exciters 72. In addition, the plurality of exciters 76 is such configured that the plurality of exciters 76 is regarded as one exciter when vibration is generated in the display cell 61 by the plurality of exciters 76.

[Modification Example H]

In the foregoing modification example E, as illustrated in FIG. 37, for example, the exciter 120 may have the plurality of exciters 121, the plurality of exciters 122, and the plurality of exciters 128. Then, the plurality of exciters 121 is such configured that the plurality of exciters 121 is regarded as one exciter when vibration is generated in the display cell 111 by the plurality of exciters 121. In addition, the plurality of exciters 122 is such configured that the plurality of exciters 122 is regarded as one exciter when vibration is generated in the display cell 111 by the plurality of exciters 122. In addition, the plurality of exciters 128 is such configured that the plurality of exciters 128 is regarded as one exciter when vibration is generated in the display cell 111 by the plurality of exciters 128.

[Modification Example I]

In the foregoing modification example F, as illustrated in FIG. 38, for example, the exciter 70 may have the plurality of exciters 76. Then, the plurality of exciters 76 is such configured that the plurality of exciters 76 is regarded as one exciter when vibration is generated in the display cell 61 by the plurality of exciters 76.

[Modification Example J]

In the foregoing modification example F, as illustrated in FIG. 39, for example, the exciter 120 may have the plurality of exciters 128. Then, the plurality of exciters 128 is such configured that the plurality of exciters 128 is regarded as one exciter when vibration is generated in the display cell 111 by the plurality of exciters 128.

Although description has been given of the present disclosure with reference to the embodiments and the modification examples, the present disclosure is not limited to the foregoing embodiments, etc., and various modifications may be made thereto. It is to be noted that the effects described herein are merely illustrative. The effects of the present disclosure are not limited to the effects described herein. The present disclosure may further include effects other than those described herein.

For example, in the foregoing embodiments, etc., the housing 71A of the exciters 71, 72, and 76 may be filled with a magnetic fluid being excellent in thermal conductivity. The housing 71A is made by the die-casting. In addition, for example, in the foregoing embodiments, etc., the housing 121A of the exciters 121, 122, and 128 may be filled with the magnetic fluid being excellent in the thermal conductivity. The housing 121A is made by the die-casting. In such cases, the magnetic fluid cools the voice coil, thus making it possible to suppress the color unevenness of the displayed images due to the local distribution of the heat.

In addition, in the foregoing embodiments, etc., for example, the signal processing units 30 and 80 and the signal processing circuit 131 may monitor integral power of electric power to be consumed in the display cells 11, 61, and 111. In such a case, the signal processing units 30 and 80 and the signal processing circuit 131 do not limit currents flowing in the display cells 11, 61, and 111 even if an instantaneous power value exceeds a predetermined threshold th. The signal processing units 30 and 80 and the signal processing circuit 131 are able to limit the currents flowing in the display cells 11, 61, and 111 in case where the integral power value exceeds the predetermined threshold th. As a result, there is no longer excessive current limitation, thus making it possible to effectively suppress heat generation without compromising visual quality.

Moreover, the present disclosure may have the following configurations.

(1)

A display apparatus including:

a thin plate-shaped display cell that displays images; and a plurality of exciters that is disposed on side of a back surface of the display cell and causes the display cell to vibrate; in which the plurality of exciters is configured to cause the plurality of exciters to be regarded as one exciter when the plurality of exciters generates vibration in the display cell.

(2)

The display apparatus according to (1), in which the display cell includes a glass substrate; and each of the plurality of exciters is able to vibrate the display cell independently of each other and is disposed in a region a maximum width of which is less than or equal to a half wavelength of 20 kHz.

(3)

The display apparatus according to (2), in which the exciters each have a housing made by die-casting.

(4)

The display apparatus according to (3), further including a counter plate that is disposed to face the display cell with a predetermined gap provided therebetween, in which in each of the exciters, the housing is fixed to the counter plate.

(5)

The display apparatus according to (3), in which in each of the exciters, the housing is fixed to a position that is different from a position facing the exciter, with respect to the back surface of the display cell.

(6)

The display apparatus according to (1), in which each of the exciters further includes:

planar coils fixed to the back surface of the display cell; and a permanent magnet that is disposed to face the plurality of planar coils with a predetermined gap provided therebetween.

(7)

The display apparatus according to (6), in which the respective exciters are fixed to the planar coils and each have a printed circuit board, the printed circuit board being fixed to the back surface of the display cell, and in the respective exciters, the planar coils are formed on a surface opposite to the display cell of the printed circuit board.

(8)

The display apparatus according to any one of (1) to (7), further including one or more heat dissipation sheets between the display cell and the respective exciters.

(9)

The display apparatus according to (8), in which the one or more heat dissipation sheets are configured by an aluminum alloy.

This application claims the benefits of Japanese Priority Patent Application No. 2016-253664 filed on Dec. 27, 2016 and Japanese Priority Patent Application No. 2017-099629 filed on May 19, 2017 with the Japan Patent Office, the entire content of which is incorporated herein by reference.

It should be understood that those skilled in the art could conceive various modifications, combinations, sub-combinations, and alterations depending on design requirements and other factors, insofar as they are within the scope of the appended claims or the equivalents thereof.

The invention claimed is:

1. A display apparatus comprising:

a thin plate-shaped display cell that displays images;

a glass substrate;

a plurality of exciters that is disposed on side of a back surface of the display cell and causes the display cell to vibrate; wherein the plurality of exciters are configured to cause the plurality of exciters to be regarded as one exciter when the plurality of exciters generates vibration in the display cell, each of the plurality of exciters is able to vibrate the display cell independently of each other and is disposed in a spatial region, in the glass substrate, a maximum width of which is less than or equal to a half wavelength of 20 kHz, and each of the exciters is in contact with a respective vibration transmission member having a characteristic of repelling at least in a sound wave frequency region, wherein the vibration transmission member has a characteristic of repelling in the sound wave frequency region and following in the frequency region below the sound wave frequency region; and one or more heat dissipation sheets, each in the form of a thin metal film, disposed between the display cell and the vibration transmission members, laminated on the back surface of the display cell, and contacted by one or more of the vibration transmission members.

2. The display apparatus according to claim 1, wherein the exciters each have a housing made by die-casting.

3. The display apparatus according to claim 2, further comprising:

a counter plate that is disposed to face the display cell with a predetermined gap provided therebetween, wherein in each of the exciters, the housing is fixed to the counter plate.

4. The display apparatus according to claim 2, wherein in each of the exciters, the housing is fixed to a position that is different from a position facing the exciter, with respect to the back surface of the display cell.

5. The display apparatus according to claim 1, wherein each of the exciters further comprises:

planar coils fixed to the back surface of the display cell; and a permanent magnet that is disposed to face the plurality of planar coils with a predetermined gap provided therebetween.

6. The display apparatus according to claim 5, wherein the respective exciters are fixed to the planar coils and each have a printed circuit board, the printed circuit board being fixed to the back surface of the display cell, and in the respective exciters, the planar coils are formed on a surface opposite to the display cell of the printed circuit board.

7. The display apparatus according to claim 1, wherein the one or more heat dissipation sheets are configured by an aluminum alloy.

* * * * *